United States Patent [19]
Arimilli et al.

[11] Patent Number: 5,901,299
[45] Date of Patent: May 4, 1999

[54] METHOD AND APPARATUS FOR TRANSFERRING DATA BETWEEN BUSES HAVING DIFFERING ORDERING POLICIES

[75] Inventors: Ravi Kumar Arimilli; Derek Edward Williams, both of Austin, Tex.

[73] Assignee: International Business Machines Corporation, Armonk, N.Y.

[21] Appl. No.: 08/934,413

[22] Filed: Sep. 19, 1997

[51] Int. Cl.$^6$ .................................. G06F 9/30; G06F 9/00
[52] U.S. Cl. ............................................. 395/308; 395/566
[58] Field of Search ..................................... 395/308, 309, 395/562, 566, 800.01, 306

[56] References Cited

U.S. PATENT DOCUMENTS

| | | | |
|---|---|---|---|
| 4,594,660 | 6/1986 | Guenthner et al. | 395/800.23 |
| 4,967,339 | 10/1990 | Fukumaru et al. | 395/386 |
| 5,481,683 | 1/1996 | Karim | 395/293 |
| 5,790,813 | 8/1998 | Whittaker | 395/293 |

*Primary Examiner*—Gopal C. Ray
*Attorney, Agent, or Firm*—Richard A. Henkler

[57] ABSTRACT

A method and apparatus for ordering operations and data received by a first bus having a first ordering policy according to a second ordering policy which is different from the first ordering policy, and for transferring the order data on a second bus having the second ordering policy. The system includes a plurality of execution units for storing operations and executing the transfer of data between the first and second buses, each one of the execution units being assigned to a group which represents a class of operations. The system also includes intra prioritizer for each group, prioritizing the word operations according to the second ordering policy exclusive of the operation stored in the other groups. The apparatus also includes inter prioritizer for determining which one of the prioritized operations can proceed to execute according to the second ordering policy. The inter prioritizer includes combiner for initially allowing both an assigned read and write operation to proceed to attempt to take control over the second bus, but upon detecting via attempt, allowing the assigned read operation to execute prior to the assigned write operation.

20 Claims, 17 Drawing Sheets

METHOD AND APPARATUS FOR TRANSFERRING DATA BETWEEN BUSES HAVING DIFFERING ORDERING POLICIES

CROSS REFERENCE TO RELATED PATENT APPLICATION

The present application is related to the below copending applications filed on even date herewith and assigned to the same assignee as the present invention. Ser. No. 08/934,414, filed on Sep. 19, 1997, entitled "Method and Apparatus for Controlling Autonomous Units Transferring Data Between Buses Having Different Ordering Policies", Attorney Docket AT9-97-385. Ser. No. 08/934,407, filed on Sep. 19, 1997, entitled "A Method and System for Transferring Data Between Buses Having Differing Ordering Policies", Attorney Docket AT9-97-390. Ser. No. 08/934,415, filed on Sep. 19, 1997 entitled "A Method and Apparatus for Transferring Data Between Buses Having Differing Ordering Policies Via the Use of Autonomous Units", Attorney Docket AT9-97-391.

BACKGROUND

1. Field of the Present Invention

The present invention generally relates to computer systems, and more particularly, to a method and apparatus for controlling units that transfer data between buses having different ordering polices.

2. Description of Related Art

The evolution of the computer industry has been driven by the insatiable appetite of the consumer for ever increased speed and functionality. One species that the evolution has created is the multi-processor computer.

The multi-processor systems, in similarity to other computer systems, have many different areas that are ripe for improvements. Once such area is the processing of bus operations between buses which have differing ordering rules/policies.

Specifically, in certain systems, it is necessary or advisable to have differing bus ordering policies for the processor and system bus. For example, the processor bus in a system may follow a particular in-order policy, whereas the system bus follows an out-of-order policy.

In such systems, the transferring of data between the differing buses must be managed with care to satisfy the ordering politics of both buses.

It would, therefore, be a distinct advantage to have a method and apparatus that could coordinate the transfer of data between buses having different ordering policies. The present invention provides such a method and apparatus.

SUMMARY OF THE PRESENT INVENTION

In one aspect, the present invention is an apparatus for ordering operations and data received by a first bus having a first ordering policy according to a second ordering policy which is different from the first ordering policy, and for transferring the ordered data on a second bus having the second ordering policy. The apparatus includes a plurality of execution units for storing operations and executing the transfer of data between the first and second buses. Each one of the execution units being assigned to a group which represents a class of operations. The apparatus further includes intra prioritizing means, for each group, for prioritizing the stored operations according to the second ordering policy exclusive of the operations stored in the other groups.

The apparatus also includes inter prioritizing means for determining which one of the prioritize operations can proceed to execute according to the second ordering policy. Each one of the execution units include at least one first unit for a first class of operations, each first unit being assigned to a single first class operation at a time. Each execution unit also includes at least one second unit for a second class of operations, each second unit being assigned to a single class operation at a time.

The inter means includes combining means for initially allowing both an assigned read and write operations to proceed to attempt to take control over the second bus, but upon detecting the attempt, allowing the assigned read operation to execute prior to the assigned write operation.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention, are within the skills of persons of ordinary skill in the relevant art.

Figure 1:
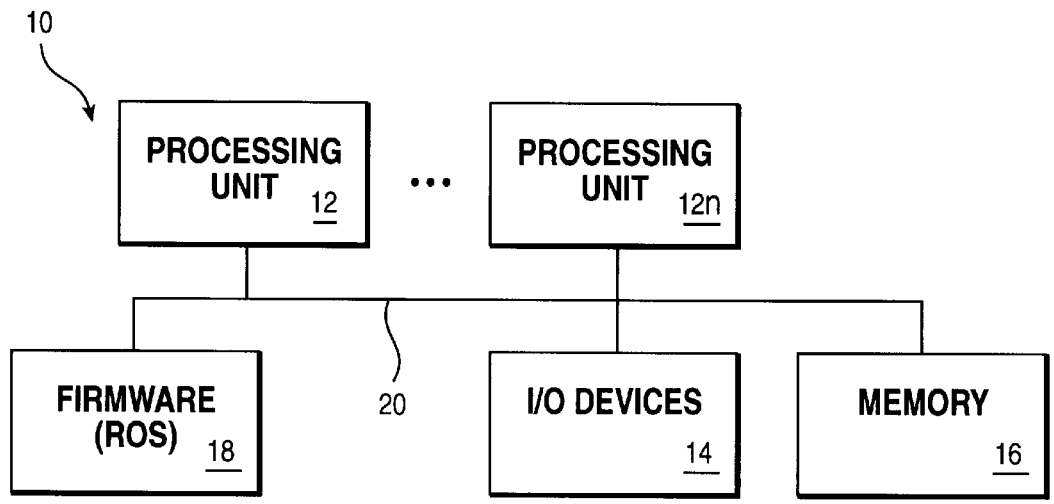
FIG. 1 is a block diagram illustrating a conventional multi-processor computer system in which the present invention can be practiced.

Reference now being made to FIG. 1, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT) a liquid crystal display (LCD) an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
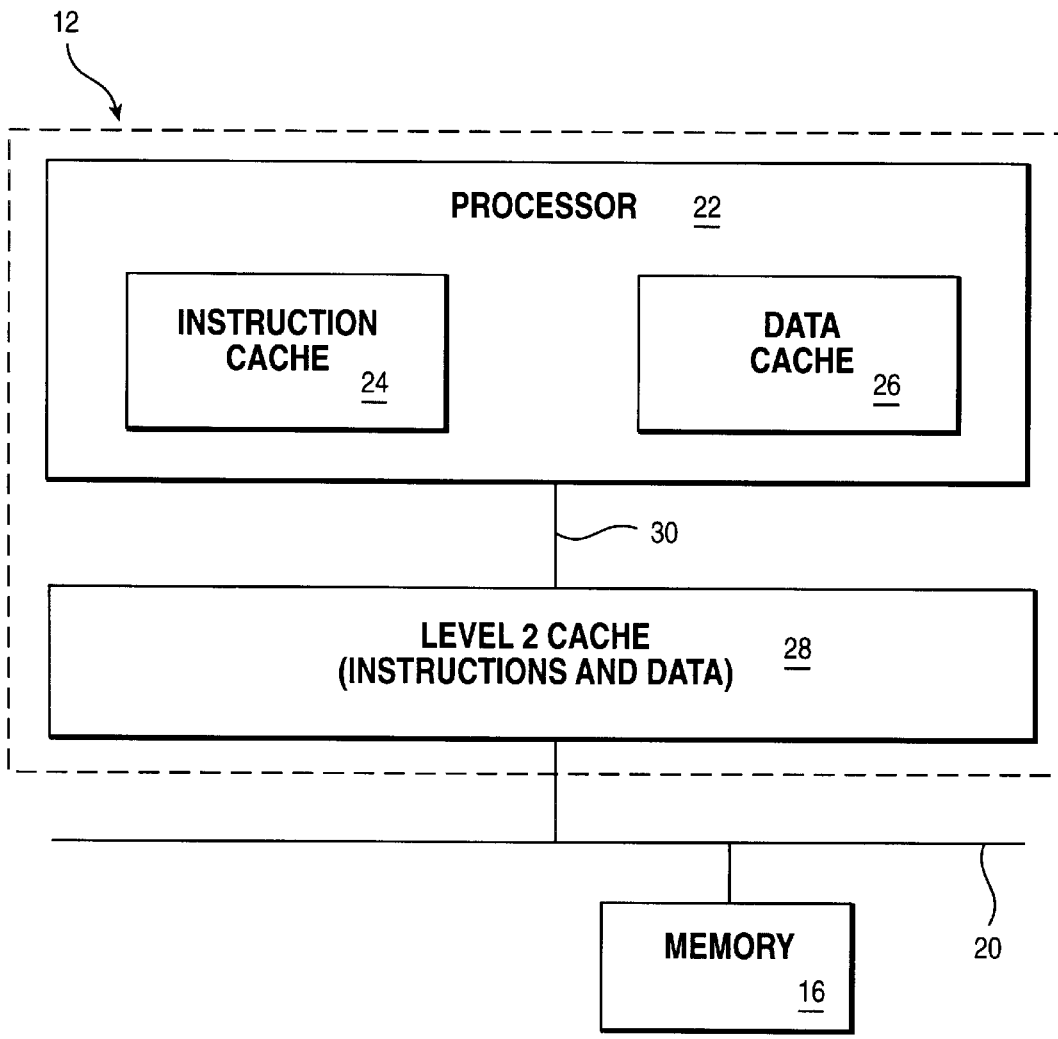
FIG. 2 is a schematic diagram illustrating in greater detail one of the processing units of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and non-volatile memory 60. Such memories include circuitry that allows information to be stored and retrieved. ROMs contain stored data that cannot be modified. Data stored in RAM can be changed by CPU 50 or other hardware devices. Non-volatile memory is memory that does not loose data when power is removed from it. Non-volatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software, such as server, an electronic bulletin board, the internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

Reference now being made to FIG. 1, a block diagram is shown illustrating a conventional multi-processor computer system (10) in which the present invention can be practiced. The computer system (10) has several processing units (12-n), which are connected to various peripheral devices, including input/output (I/O) devices (14) (such as a display monitor, keyboard, and permanent storage device), memory device (16) (such as dynamic random access memory or DRAM) that is used by the processing unit (12-n) to carry out program instructions, and firmware (18) whose primary purpose is to seek out and load an operating system from one of the peripherals (usually the permanent memory device) whenever the computer system (10) is first turned on.

The processing units (12-n) communicate with the peripheral devices (14) by various means including a system bus (20). Computer system (10) can have additional components which are not shown, such as serial and parallel ports for connection to other peripherals (e.g. modems or printers). Those skilled in the art would further appreciate that there are other components that might be used in conjunction with those shown in FIG. 1. In example, a display adapter might be used to control a video display monitor, a memory controller can be used to access memory (16), etc . . . .

In a symmetric multi-processor(SMP) computer, all of the processing units (12-n) are, generally identical, that is, they all use a common set or subset of instructions and protocols to operate, and generally have the same architecture.

Reference now being made to FIG. 2, a schematic diagram is shown illustrating in greater detail the processing unit (12) of FIG. 1 according to the teachings of the present invention.

Specifically, processing unit (12) includes a processor (22) having a plurality of registers and execution units (not shown) which carry out program instructions in order to operate the computer system (10). The processor (22) can also have caches, such as instruction cache (24), and data cache (26). These caches (24 and 26) are referred to as "on-board" when they are integrally packaged with the processor's registers and execution units.

In general, caches are commonly used to temporarily store data, that may be repeatedly accessed by a processor, in order to speed up processing by avoiding the accessing times associated with retrieving data from memory (16).

The processing unit (12) can include additional caches, such as cache (28). Cache (28) is referred to as a Level2 (L2) cache since it supports the on-board Level1 (L1) caches (24 and 26). In other words, L2 cache (28) acts as an intermediary between memory (16) and the onboard caches (24 and 26), and can store a much larger amount of information (instructions and data) as compared to the on-board caches, but retrieval of this data takes more time than retrieval of data from the L caches (24 and 26).

In example, L2 cache (28) can be a chip having a storage capacity of 256 or 512 kilobytes, while the processor (22) may be an IBM PowerPC 604—series processor having on-board caches (24 and 26) with 64kilobytes of total storage.

As is shown in FIG. 2, the L2 cache (28) is connected to system bus (20), and all loading of information from memory (16) into processor (22) must come through L2 cache (28). Although FIG. 2 depicts only a two level cache hierarchy, the present invention is equally applicable to multi-level cache hierarchies where there are many levels of serially connected caches.

Figure 3:
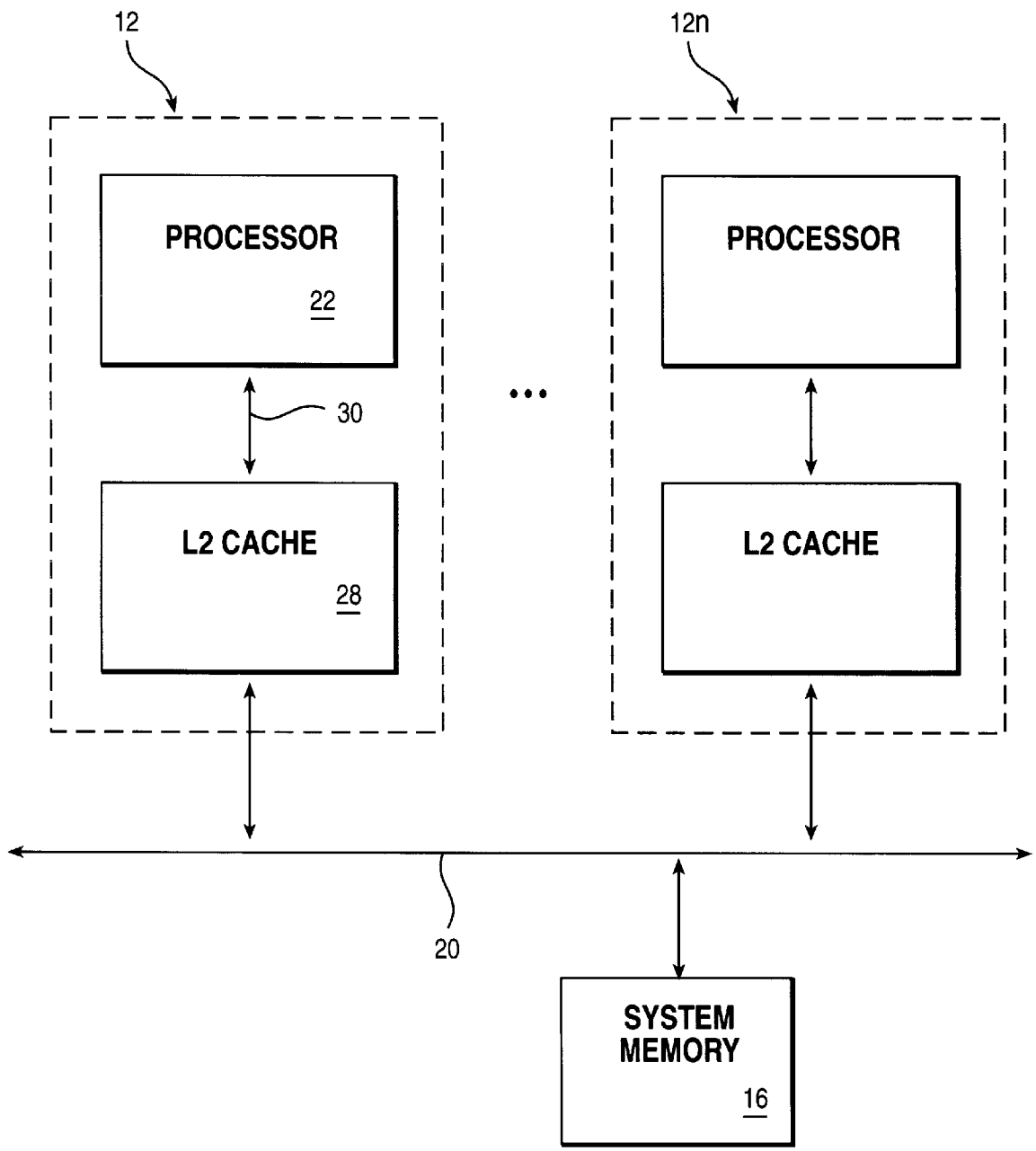
FIG. 3 is a schematic diagram illustrating in greater detail the processing units of FIG. 1 according to the teachings of the present invention.

Reference now being made to FIG. 3, a schematic diagram is shown illustrating in greater detail the processing units (12-n) of FIG. 1 according to the teachings of the present invention. As shown, each of the processing units (12-n) have a processor (22) with an integrated L1 cache (not shown) and an L2 cache (28). Each processor (22-n) is connected to its respective L2 cache (28-n) by means of a processor bus (30-n).

The processor bus (30) is used to communicate requests from the processor (22) to the L2 cache (28), requests from the L2 cache (28) to the processor (22), and to transfer data between the L2 cache (28) and the processor (22). The L2 caches (28-n) are further connected to a system bus (20). The system bus (20) is used to provide communication between the processing units (12-n) and the system memory (16).

Buses (30 and 20) communicate operations between the various processors (22-n) and caches (28-n) in the system (10). The above noted buses (30 and 20) are typically divided into two distinct parts: one for the transfer of addresses and operations (i.e. the address bus), and another for transfer of data (i.e. the data bus). In order to assist in the explanation of the present invention, the various parts of the buses (30 and 20) will be referred to hereinafter in a collective fashion (e.g. processor bus 30, system bus 20).

When an operation is placed onto a bus by either a processor (22) or L2 cache (28), the other participants attached to the bus or the other processing unit's L2 (28-n) caches, or the processors (22-n)) determine if the operations can be allowed to proceed.

If the operation cannot be allowed to proceed, then the other participants, either singly or collectively, signal the initiating unit that the operation must be "retried". If an operation is retried, it is not executed immediately, but rather, the initiating unit is required to re-initiate the operation, if it is still required, at a later point in time. The process of placing an operation on the bus, and then receiving a "retry" or "no-retry" response is known, and referred to hereinafter, as an "address tenure".

There are two different forms of address tenures: address-only tenures, and address-data tenures. Address only tenures occur on the address bus exclusively, and are used to communicate, through the system, those operations that do not directly transfer data. For an address-only tenure, the operation is considered completed once the address-tenure has been completed without retry. For address-data tenures, the address-tenure causes a later tenure on the data bus known as a "data-tenure".

Data-tenures are used to transfer data throughout the system. A data-tenure operation includes:

(1) arbitrating for the data bus;
(2) gaining ownership; and
(3) transferring data in a number of "beats" on the data bus.

The above noted bus architecture is called a "retry" bus, and is well known by those skilled in the art.

It is common for the address bus and the data bus to operate in a coordinated, but largely independent fashion. Once the address-tenure portion of an address-data tenure has occurred without retry, the address bus is free to be used for other subsequent address-tenures. The data-tenure for the address-data tenure will occur on the data bus at a later point in time, possibly coincident in time with other independent address-tenures on the address bus portion of the overall bus. Such a bus is commonly referred to as "split-transaction" bus, and is well known to those skilled in the art.

Within split transaction buses, there is a further subdivision relating to the ordering of data-tenures with respect to the address-tenures. In one division, the data-tenures occur in the order the address-tenures occur. This is referred to hereinafter as an "in-order" bus.

Figure 4:
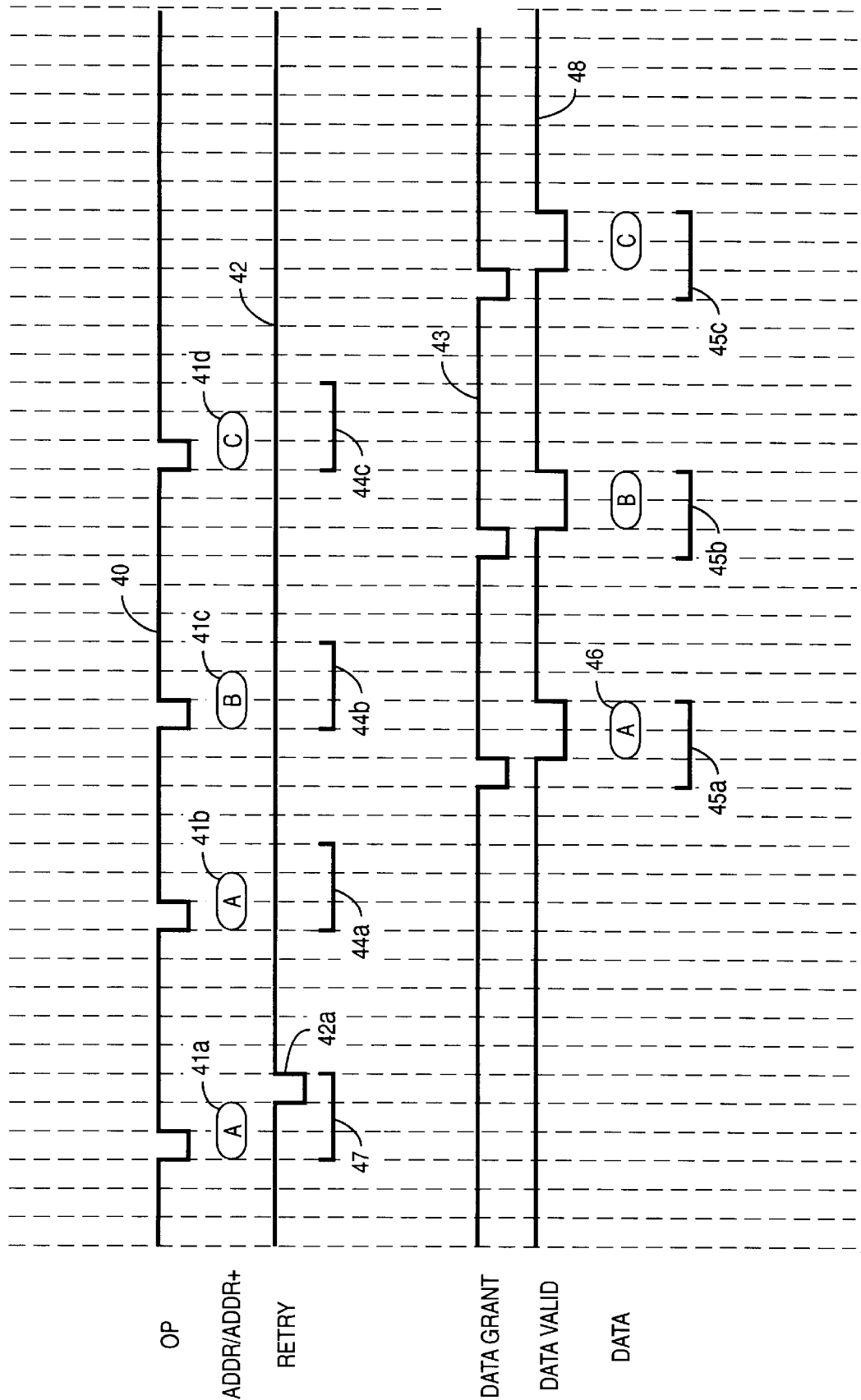
FIG. 4 is a timing diagram illustrating an example of three successful address-data tenures for an in-order bus.

Reference now being made to FIG. 4, a timing diagram is shown illustrating an example of three successful address-data tenures for an in-order bus. The address portion of the overall bus is represented by a low-active signal OP (40) which indicates the presence of an operation on the address bus, a collection of signals ADDR/ADDR+(41a–d) which indicate the address of an operation and its type, and a low-active signal RETRY (42) which indicates whether or not an operation must be retried. If the RETRY signal (42) is active immediately after an address tenure, then that address-tenure must be retried.

In example, the first address tenure (47) is retried, as shown by the retry signal (42a) being active immediately after the address tenure (41a). Since address tenure (47) is retried it is repeated again at (44a). The repeated address-tenure (44a) is not retried resulting in the later occurrence of a data bus tenure (45a).

The data bus portion of the overall bus is represented by a low-active signal DATA GRANT (43) which indicates the beginning of a data-tenure, a low-active signal DATA VALID (48) which indicates the presence of valid data on the data bus, and a set of signals DATA (46) are used to transfer data. The data-tenure starts with the DATA GRANT signal (43) going active, signalling the beginning of the data tenure. The DATA VALID signal (48) is then made active when the data beats are valid on the data bus. The data tenure ends after a predetermined number of beats (two in this example) of data are transferred on the data signals.

The three illustrated data-tenures (45a–c) correspond to the address-tenures (44a–c), respectively, as indicated by labels "a", "b", "c". The order of the data-tenures (45a–c) is implied by the order of the address-tenures (44a–c). In an in-order split transaction bus architecture, the data tenure can only occur after the corresponding address tenure has successfully completed. In addition, all data tenures must occur in the same order as the address tenures.

In contrast, an out-of-order split transaction bus removes the restriction that the data tenures must occur in the same order as the address tenures. In an out-of-order bus, the data tenures are allowed to occur in any order relative to the address tenures. However, data tenures are still caused by successful address tenures, and therefore, a given data tenure cannot occur before the successful completion of its corresponding address tenure.

Figure 5:
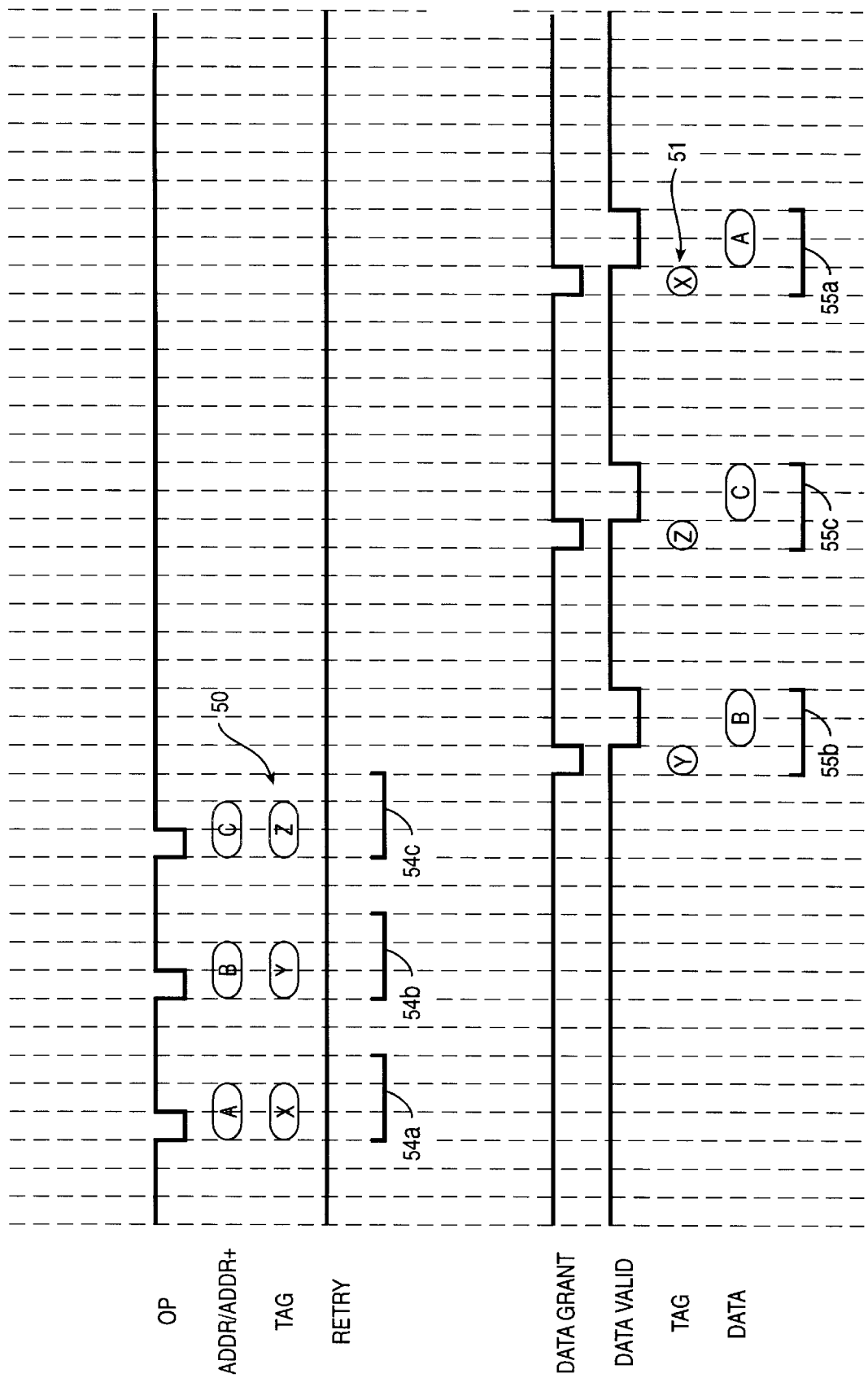
FIG. 5 is a timing diagram illustrating an example of operations executing on an out-of-order bus.

Reference now being made to FIG. 5, a timing diagram is shown illustrating an example of operations on an out-of-order bus. In general, the bus shown in FIG. 5 is largely similar to that shown in FIG. 4. A new group of signals, however, have been added to both the address and data portions of the overall bus to support the out-of-order data tenures. These are the "TAG" signals (50, 51). The tag signals (50–51) are necessary in order to correctly signify the relationship between address and data tenures. For the in-order bus, this relationship was implicit in the ordering of the operations, and therefore, no tagging was required. In an out-of-order bus, however, some tagging means must be used in order to correctly maintain the relationships between address and data tenures (i.e. tag signals 50–51).

The tag signals (50–51) are distinct for the address and data portions of the overall bus. When the address-tenure portion of an address-data tenure is presented on the address bus, a unique tag is presented on the address tag signals (50). This tag value will then be used later by the system to signify the data tenure that corresponds to this address tenure. By using tags, the system can correctly correspond address and data tenures.

For example, three address tenures (54a–c) and their corresponding data tenures (55a–c) are illustrated in FIG. 5. The data tenures for the second address tenure (54b) and the third address tenure (54c) occur on the data bus before the data tenure for the first address tenure (54a). Those skilled in the art will readily recognize that the above noted example is but one of many potential ordering scenarios.

In an out-of-order bus, any ordering of the data tenures that result from data tenures occurring after the successful completion of their corresponding address tenures is possible.

For any bus in the system, some means must be provided to control the operation of the address and data portions of the bus. In particular, a means must be provided to control when operations are placed on the respective address and data buses, and to prevent collisions on the bus between the multiple participants. The address and data portions of an overall bus are controlled by separate means that co-operate to insure the correct operation of the overall split transaction bus.

The data portion of the bus is typically controlled by means of a DATA GRANT signal. Each participant attached to a given bus receives a unique DATA GRANT signal from the data bus control mechanism. The other principal control signal for the data bus is the DATA VALID signal. The DATA VALID signal is used to indicate that a beat of data is being transferred on the data portion of the data bus.

Figure 6:
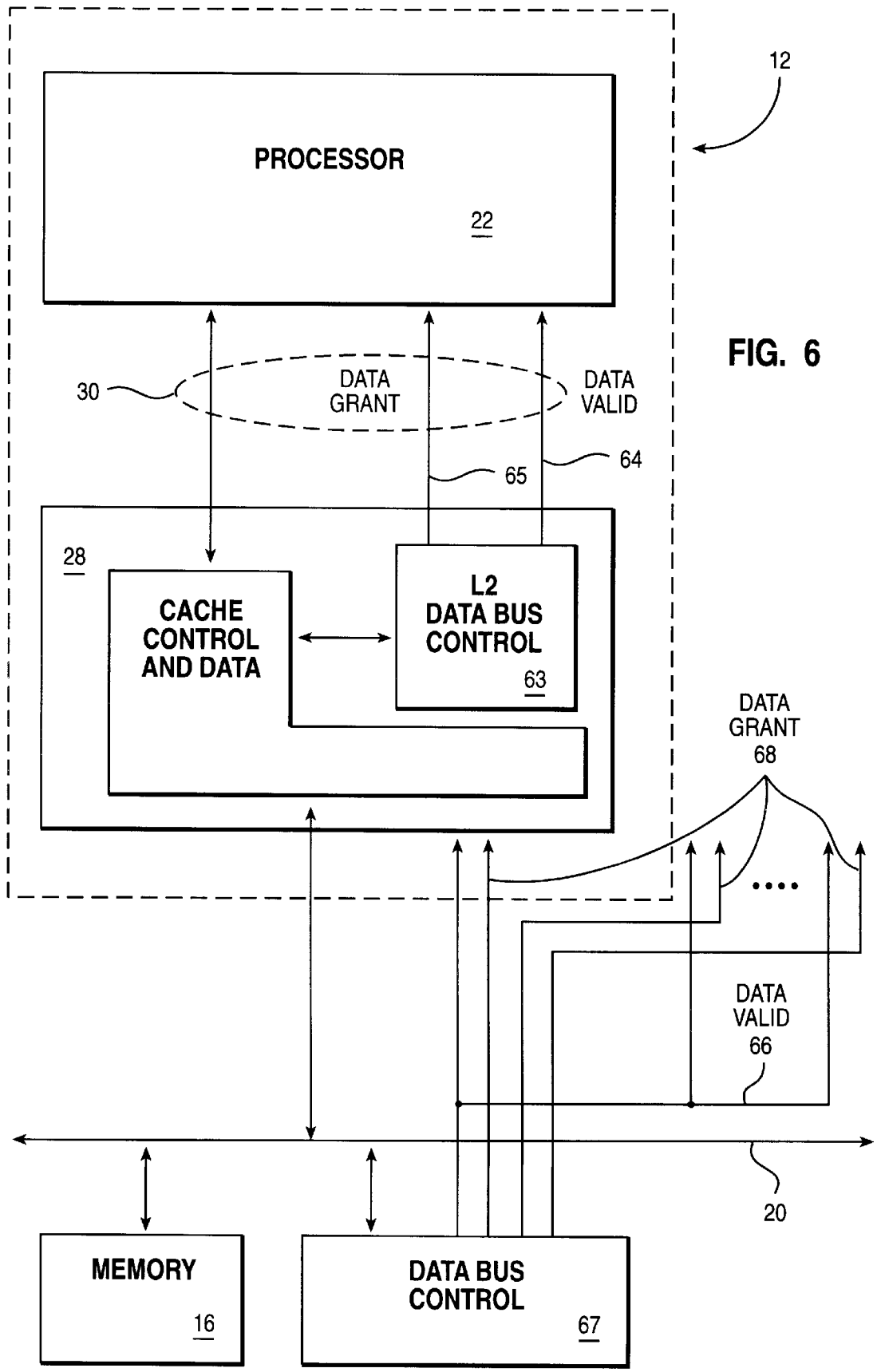
FIG. 6 is a schematic diagram illustrating in greater detail one of the processing units of FIG. 1 according to the teachings of the present invention.

Reference now being made to FIG. 6, a schematic diagram is shown illustrating the processing unit (12) of FIG. 1 in greater detail according to the teachings of the present invention. Processing unit (12) includes a processor (22) and an L2 cache (28). The bus (30) connecting the processor (22) and the L2 cache (28) is generically referred to as the "processor bus" (30). The bus connecting the L2 caches (28-n) together in the system is generically referred to as the system bus (20).

Within the L2 cache (28) a control unit (63) is used to control the data bus and drives both the DATA GRANT (65) and DATA VALID (64) signals. Note that L2 cache (28) has complete control over data bus tenures on the processor bus (30), because the DATA GRANT (65) and the DATA VALID (64) signals are driven from the L2 cache (28) to the processor (22).

In a similar fashion, the data bus portion of the system bus (20) is controlled by another control unit (67). Control unit (67) drives a common DATA VALID signal (66) to all processing units (12-n) in the system (10) (only the first processing unit (12) is explicitly shown).

In addition, the Control unit (67) drives an individual DATA GRANT signal (68) to each individual processing unit (12-n). In this manner, the Control unit (67) can control each individual processing unit's (12-n) access to and transfer of data on the system data bus (20). The Control unit (63) is similar to the Control unit (67), with the exception that the Control unit (63) is simplified to control only one participant. It should be noted, however, that it is possible to have multiple processors attached to a single L2 cache (28), in which case, the Control unit (63) would be substantially similar to Control unit (67).

There are typically two types of address-data tenure operations (reads and writes). The read address-data tenure is used to read data into the processor (22-n) of a processing unit (12-n) (data flows from the system to the processor). For writes, the processor (22-n) writes one or more locations with new data from the processor (22-n) (data flows from the processor to the system).

For a read address-data tenure, the processor (22) places a read request on the address portion of the processor bus (30). The L2 cache (28) may retry this request a number of times before accepting it. This request causes the L2 cache (28) to retrieve the requested data either from the L2 cache (28) itself, system memory (16), or one of the other L2 caches (28n) in the system. When the data becomes available to L2 cache (28), it will no longer retry the request, and will present the data to the processor (22) as a data tenure on the processor data bus (30). The Control unit (63) will place this data tenure onto the processor data bus (30) at the proper time, and will cause the data bus lines to be driven from the L2 cache (28) to the processor (22) with the requested data. Due to the split-transaction nature of the bus, several operations may be outstanding at one time, and the Control unit (63) is responsible for ordering the data bus tenures correctly.

For a write address-data tenure, the processor (22) has new data values that need to be written to the system (10) (i.e. the L2 cache (28) and the potentially the main memory 16). The processor (22) places a write request on the address portion of the processor bus (30). Note that, by convention, the write data must be ready before the processor can initiate the write address tenure. If the L2 cache (28) retries the request, then the processor (22) must re-initiate the request, if still needed, at a later point in time. If, however, the request is accepted, then the L2 cache (28) will, at some future point in time, grant the processor data bus (30) to the processor (22), and drive the DATA VALID (65) signal causing the processor (22) to write the data to the L2 cache (28). The processor (22) drives the data signals to the L2 cache (28).. Once again, due to the split transaction nature of the bus, the data bus control unit (63) must correctly order the data tenures including the ordering between data tenures for read and write operations.

For an in-order bus, the data tenures for reads and writes occur in the same order in which their respective address tenures completed successfully. There is no reordering of read data tenures with respect to write data tenures and vice-versa. Therefore, the processor (22) and L2 cache (28) can correctly determine/indicate the type of data tenure implicitly from the ordering.

For an out-of-order bus, however, the data tenures can occur in any order so long as the data tenures occur after their respective address tenures. The tags are used by the processor (22) and L2 cache (28) to determine/indicate if the data tenure is a for a read or a write operation, and therefore, whether to read or to source data onto the data bus signals of the system (20) or processor (30) bus.

Figure 7:
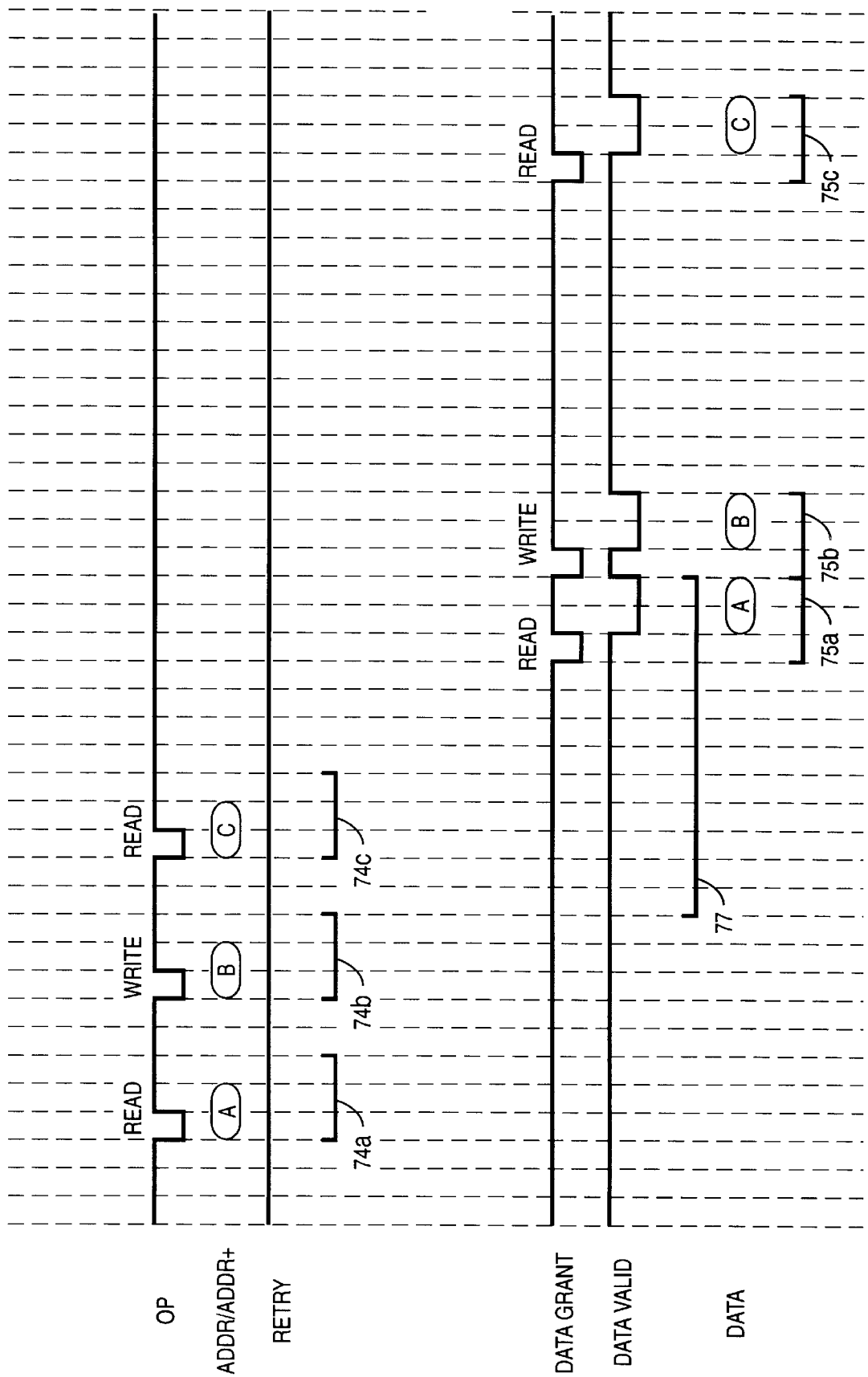
FIG. 7 is a timing diagram illustrating an example of address data tenures for reads and writes executing on an in-order bus.

Reference now being made to FIG. 7, a timing diagram is shown illustrating an example of address data tenures for reads and writes executing on an in-order bus. Specifically, three address data tenures are shown: two reads and a write. The data tenures (75a–c) for these operations occur on the data portions of the bus in the order that the address tenures (74a–c) occur. The first read tenure is followed by a write tenure. Even though the data from the second data tenure (74b) (write), is ready by convention as soon as the processor places the address tenure on the bus, the processor is prevented from executing the data tenure until the data tenure from the previous outstanding operation (74a) has completed. The write tenure (74b) is delayed unnecessarily from the point after the write address tenure completes until the read data tenure completes (77) to satisfy the in-order ordering constraint on the data tenures.

The in-order constraint leads to lower performance, and can also lead to system deadlocks in certain situations. To overcome these problems and provide better performance many systems employ a technique that allows partial re-ordering of the data tenures. Those skilled in the art will readily recognize this bus as a "partially-in-order bus".

In a partially-in-order bus, one or more types of operations are allowed to bypass other operations, and execute their data tenures early. For a partially-in-order bus, the operations that execute data tenures are divided into distinct classes. For operations within a given class, the data tenures are executed in-order with respect to the address tenures of operations in that same class.

However, between classes, data tenures can be reordered. In order to accomplish this re-ordering, additional signals are added to the DATA GRANT signal to specify which class of operations a given DATA GRANT signal applies to.

A grant to a given class is for the operation in that class that has been outstanding the longest (successful completion of the address tenure without retry). This insures that data tenures within a given class execute in the same order as their respective address tenures. How the data tenures for operations in different classes can be re-ordered varies with the details of the particular implementation of the partially-in-order bus.

As a particular example, consider a partially-in-order bus where reads constitute one class of operations and writes constitute another. Within these classes, the data tenures execute in-order with respect to one another. However, write operations are allowed to bypass outstanding reads. Reads, however, are not allowed to bypass outstanding writes.

One additional signal must be added to a standard in-order bus to implement this capability (i.e. WRITE GRANT). The WRITE GRANT signal is used to specify when a DATA GRANT is to be used for the longest outstanding write data tenure, even if the grant would otherwise be used by a read data tenure. In other words, if a read data tenure is outstanding and would be the next to use the bus and a write data tenure is also outstanding, then a DATA GRANT signal with WRITE GRANT also active indicates that the next data tenure is to be used for the longest outstanding write instead of the read.

Figure 8:
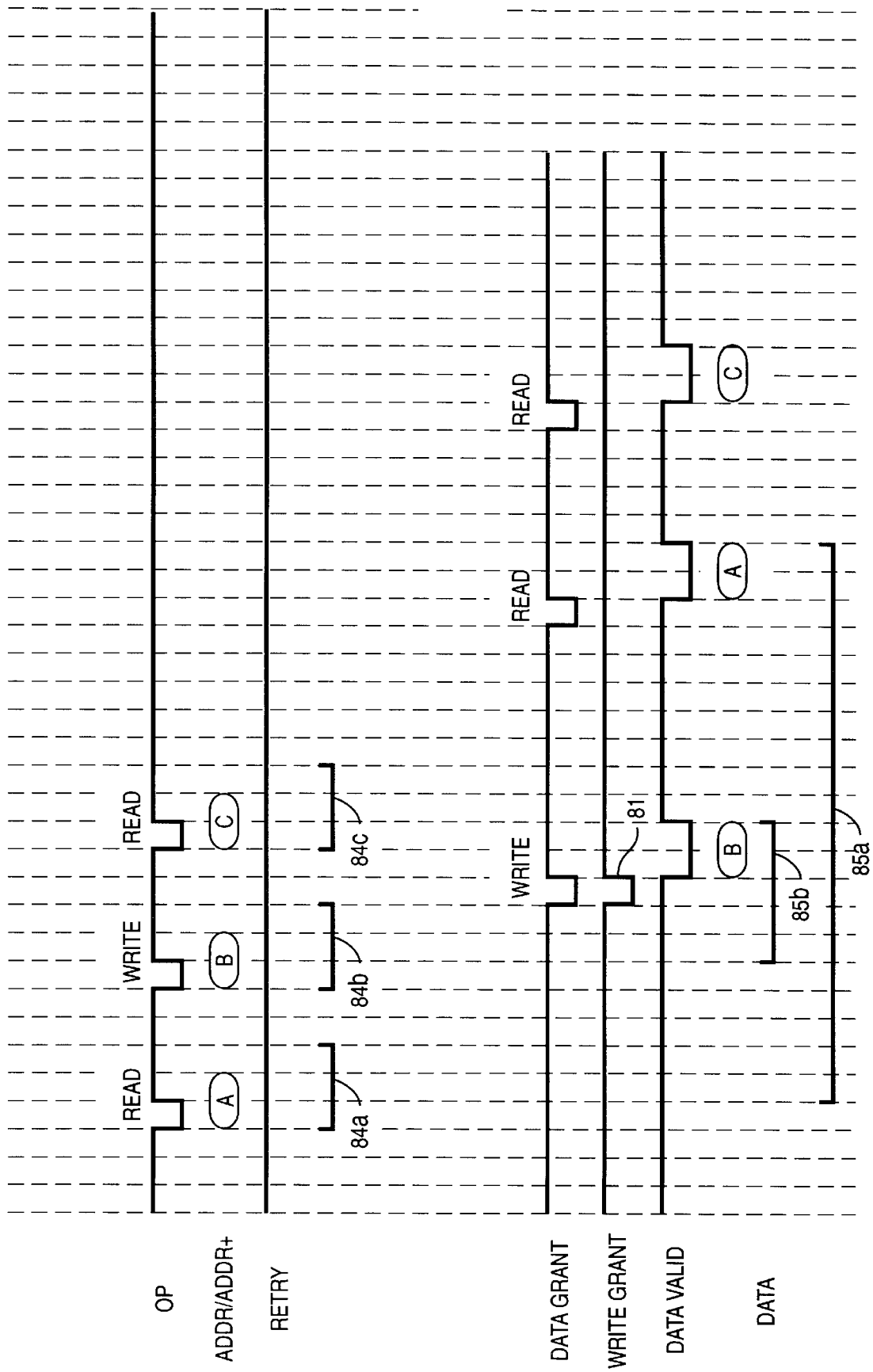
FIG. 8 is a timing diagram illustrating an example of operations on a partially-in-order bus.

Reference now being made to FIG. 8, a timing diagram is shown illustrating an example of operations on a partially-in-order bus. Specifically, two read (84a–c) and one write (84b) operations are illustrated. The write's data tenure is executed out of order with respect to the read data tenures. Immediately after the write address tenure (84b) completes successfully, the L2 cache grants the bus to the write by activating DATA GRANT with WRITE GRANT (81). The WRITE GRANT indicates to the processor to perform the data tenure for the write (84b) instead of the outstanding read (84a). Most implementations that bypass reads in this fashion will immediately grant the data bus to a write operation if the bus is available. Granting the data bus to the write effectively "envelopes" the write operation (85b) within the previous read operation (85a).

It is possible to have a number of read and write operations interleaved in this fashion. For example, if another write address tenure had occurred after the last read address tenure (84c), but before the first read data tenure was performed, the L2 cache could have given another DATA GRANT with a WRITE GRANT, and performed the second write data tenure before performing the data tenure for the first read.

In general, a DATA GRANT signal with an active WRITE GRANT indicates that the data bus should be used to perform the longest outstanding write tenure instead of a read data tenure that would have otherwise been performed. A WRITE GRANT signal is only necessary when a write data tenure is to bypass a read data tenure. A WRITE GRANT signal is not necessary to grant the data bus to a write tenure that is next to gain ownership of the data bus. If WRITE GRANT is activated when a write data tenure would have been the next tenure anyway, then the WRITE GRANT is ignored. If WRITE GRANT is activated with no outstanding writes, the WRITE GRANT is also ignored, and the data bus is used for the longest outstanding read data tenure.

The partially-in-order bus is a comprise between a fully-in-order bus and an out-of-order bus. The data tenures for each given class in a partially-in-order bus may be re-ordered with respect to operations within other classes, but operations within a given class are executed in-order. If the requirement to execute operations within a class in-order is removed, a partially-in-order bus becomes an out-of-order bus.

In certain systems, it is necessary or advisable to have differing bus ordering policies for the processor and system buses. For example, the processor bus may follow a partially-in-order policy, whereas, the system bus follows an out-of-order policy. It is therefore desirable to devise a means of coordinating the transfer of data between buses having differing ordering policies.

Figure 9:
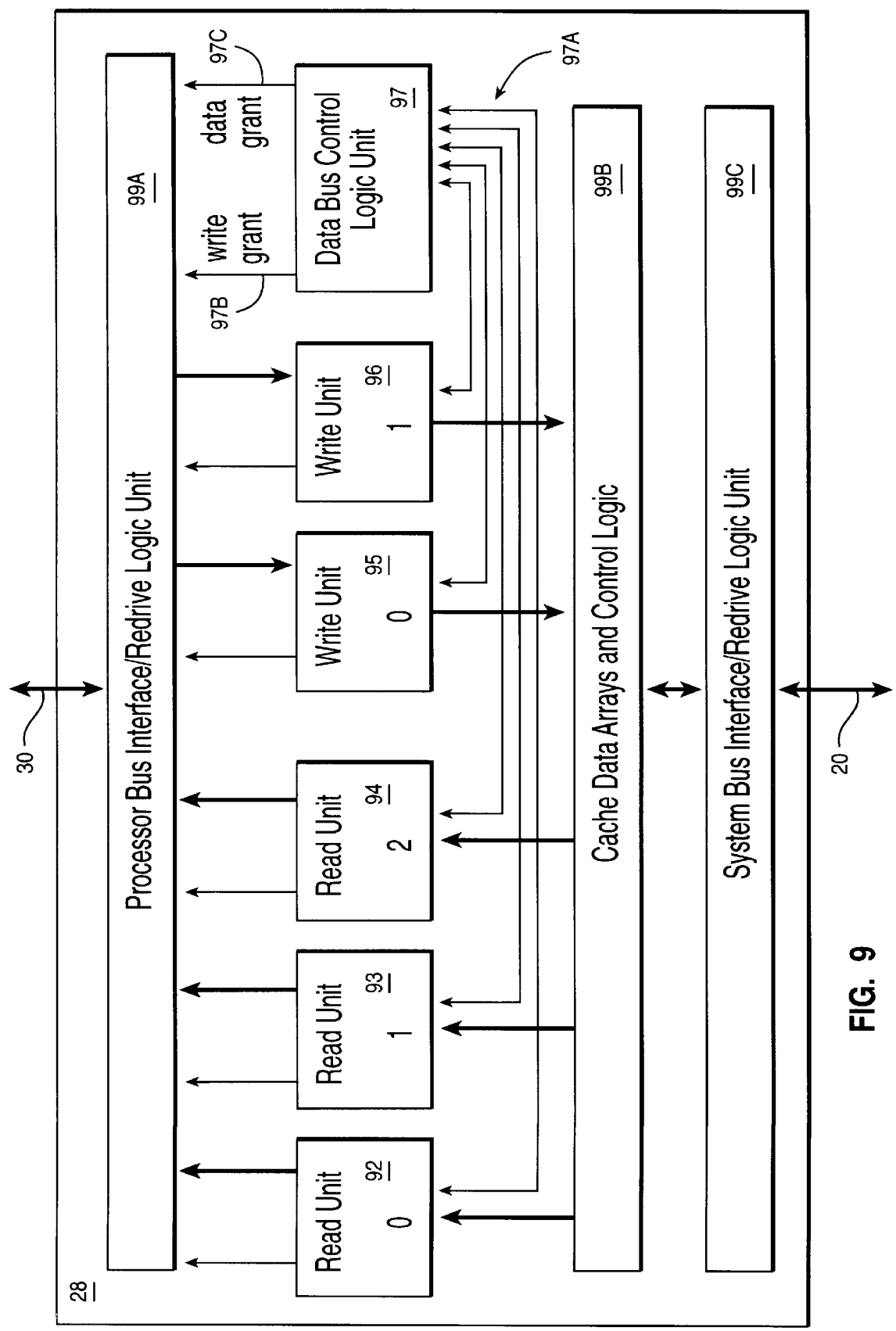
FIG. 9 is a schematic diagram illustrating in greater detail the L2 cache of FIG. 6 according to the teachings of the present invention.

Reference now being made to FIG. 9, a schematic diagram is shown illustrating in greater detail the L2 cache (28) of FIG. 6 according to the teachings of the present invention. As previously discussed, L2 cache (28) is connected to a processor bus (30) and a system bus (20), and transferring data therebetween. In the preferred embodiment of the present invention, the processor bus (30) is a partially-in-order bus of the type known as the PowerPC 60X bus. A complete description of the PowerPC 60X bus can be found in the PowerPC 604 RISC Microprocessor User's Manual (MPC604UM/AD), which is hereby incorporated by reference herein.

In the preferred embodiment of the present invention, the system bus (20) is an out-of-order bus that uses tagging to coordinate data tenures as previously discussed.

As shown in FIG. 9, L2 cache (28) includes a number of units (92–96) to control data transfers. More specifically, read units (92–94) and write units (95–96). Those individuals of ordinary skill in the art will readily recognize that the number of units for each group (read, write) is arbitrary with respect to the particular embodiment, and can change according to price/performance/design constraints of the apparatus being implemented. Consequently, the number of units selected for controlling data transfer in the preferred embodiment, are not to be considered a limitation, but rather, a convenient and preferred method and apparatus for implementing the present invention.

Each of the read units (92–94) is responsible for controlling the action of a complete read address-data tenure. In other words, as a read address tenure successfully completes, the read operation is assigned to a specific available read unit (92–94) which coordinates the action necessary to complete the read operation. Likewise, the write units (95–96) are responsible for controlling the actions for all write address-data tenures.

The L2 cache (28) also includes a Data Bus Control Logic unit (97) to control the operations of the individual read and write units (92–96), and in particular, to control when the individual units (92–96) place data on or read data from the processor data bus (30). The above noted task is accomplished through a number of individual control signals, collectively referred to as (97a), passed between the individual units (92–96) and the data bus control logic unit (97). In addition, the Data Bus Control Logic unit (97) drives the DATA GRANT signal (97c), and the WRITE GRANT signal (97b) to the processor bus (30) via the processor bus interface/redrive logic unit (99a).

The processor bus interface/redrive logic unit (99a) merely serves to buffer and latch signals to and from the processor bus (30). Thus, the data bus Control logic unit (97) coordinates and controls the ordering on the processor bus (30).

In addition, L2 cache (28) also includes a Cache Data Arrays and Control Logic unit (99b), and a System Bus Interface/Redrive Logic unit (99c). In general, these units (99b–c) control the caching of data, and interface to the system bus (20), respectively.

The operation of the individual read and write units (92–96) as well as the Data Bus Control Logic unit (97) can best be explained in context of a specific partially-in-order bus. Once again, in the preferred embodiment of the present invention, the partially-in-order bus is a PowerPC 60X bus.

The PowerPC 60X bus is a partially-in-order bus where operations that generate data tenures are divided into two classes: read and writes. Data tenures for reads execute in-order with respect to their corresponding address tenures, and write data tenures execute in-order with respect to their corresponding address tenures. Write data tenures, however, are allowed to bypass read data tenures if a WRITE GRANT signal (DBWO_) is active with a DATA GRANT signal, (DBG_). Read data tenures are not allowed to bypass write data tenures. The DATA VALID signal is referred to hereinafter as TA_.

Figure 10:
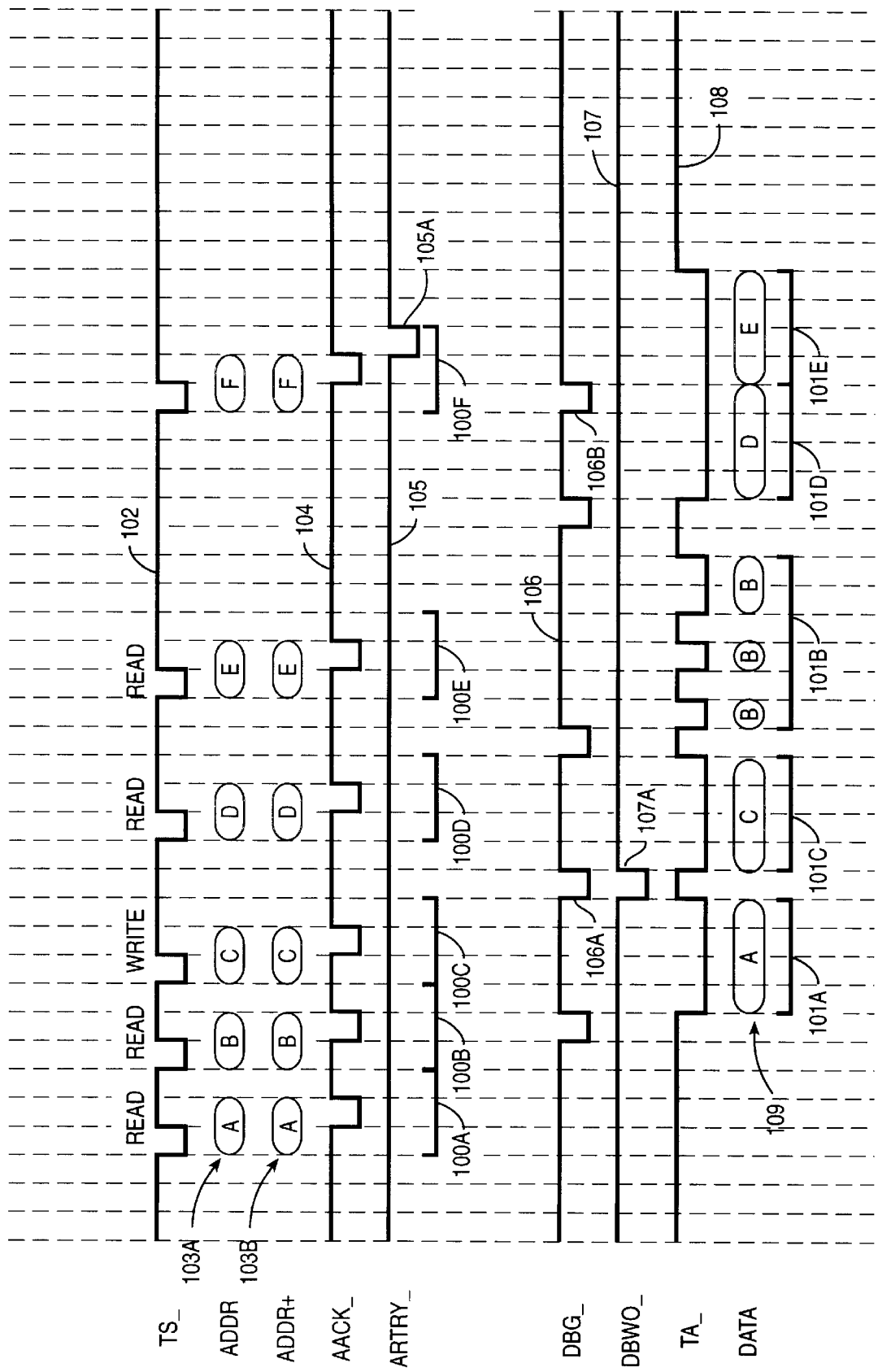
FIG. 10 is a timing diagram illustrating selected exemplary operations for the PowerPC™ 60X bus to further illustrate the operation thereof.

Reference now being made to FIG. 10, a timing diagram is shown illustrating selected exemplary operations for the PowerPC 60X Bus to further illustrate the operations thereof. As shown therein, five successful address tenures (100a–e) and an unsuccessful (retry) address tenure (100f) are illustrated. The 60X bus uses a signal, TS_, (102) to signify the beginning of an address tenure. The TS_ signal is low active, and can only be active at most once every three cycles.

The first three address tenures (100a–c) are shown at the maximum possible rates for the PowerPC 60X bus. The end of an address tenure is signified by another low active signal (104): AACK_. The AACK_signal is used to denote the end of the address tenure, and can occur as early as the cycle after the TS_signal or any cycle thereafter.

In the preferred embodiment of the present invention, the AACK_signal (104) is always active the cycle after TS_signal. During the address tenure, two sets of signals ADDR (103a) and ADDR+ (103b) are driven to signify the address and type of the operation, respectively.

The ADDR+ (103b) signal collectively represents the PowerPC 60X bus signals TT, TBST_, TBSIZE, GBL_, CI_, WT_, and TC. The cycle after the AACK signal (104) is the cycle in which the retry signal ARTRY_(105) is considered valid. If an address tenure occurs without the ARTRY_(105) signal being active the cycle after the AACK_signal (104), then the address tenure has completed successfully. The first five address tenures are shown as not being retried, while the sixth address tenure (100f) is shown as being retried via the condition of the ARTRY signal (105a).

The data bus portion of the PowerPC 60X bus includes a low active DATA GRANT signal (DBG) (106), a low active WRITE GRANT signal (DBWO_) (107), a low active DATA VALID signal (TA_) (108), and a data bus (109).

A data tenure begins with the activation of DBG_(106) for a single cycle. The DBG_signal (106) is only active for one cycle per data tenure (certain modes of operation of the PowerPC 60X bus allow DBG_to be active for multiple cycles). After the data bus (109) is granted by the DBG_ signal (106), four beats of data are transferred on the data bus (109) for both reads and writes as signified by the activation of the TA_signal (108). These transfers are known as "burst" transfers. For read and write data tenures, it is possible to drive the TA_signal (108) for four contiguous cycles, (e.g. data tenure (101a)), or to intersperse as many "dead cycles" as are necessary between the TA_signals (e.g. data tenure (101b)).

In the preferred embodiment of the present invention, dead cycles are not interspersed into write data tenures, but rather, the present invention performs all write data tenures as four contiguous beats on the data bus (109). Dead cycles are interspersed with read data tenures, as needed, in order to handle data pacing from the system bus.

The DBG_signal (106), generally, can be driven active for a successive data tenure only after all four beats of data have occurred for the immediately preceding data tenure as shown by the DBG_(106a) signal. However, it is possible, using a mode of the PowerPC 60X bus known as "fast-L2 mode", to drive the DBG_signal (106) coincident with the last beat of data for a read data tenure, if the following data tenure is also for a read (e.g. DBG_signal (106b)). This has the effect of allowing data tenures for read operations to "run together" (e.g. data tenures (101d–e)). If, however, the data tenures are a write tenure following a write or read, or a read tenure following a write tenure, the DBG_signal (106) may not be driven until the cycle after all four beats of data have completed on the data bus (109) as signified by the activation of the TA_signal (108).

The WRITE GRANT signal for the PowerPC 60X bus is referred to hereinafter as DBWO_(107). The WRITE GRANT signal (107) is low active, and can only be active during cycles that the DBG_signal (106) is active. The DBWO_signal (107) is used to signify that the data bus tenure granted by the DBG_signal (106) should be used to perform the longest outstanding write data tenure, instead of the longest outstanding read tenure, even if the read tenure would otherwise have priority.

Thus, it can be seen from the above, that the DBWO_ (107a) signal causes the data bus (109) to be used to perform the data tenure for the address tenure (100c) even though read (100b) had occurred earlier, and is outstanding to go to the bus.

The PowerPC 60X bus protocol also supports address-tenures for reads and writes that only transfer one beat of data on the system bus. These operations are collectively known as "single beat" operations. To prevent collisions with the "burst" operations described above, the preferred embodiment of the present invention retries single beat operations until all outstanding burst operations have completed. When there are no outstanding burst operations, single beat operations are allowed and complete immediately on the data bus, after the respective address tenure, but before another burst operation can be posted to the data bus. Therefore, single beat operations are not controlled directly by the present invention, but rather, are removed from interfering by the mechanism that retries operations.

Figure 11:
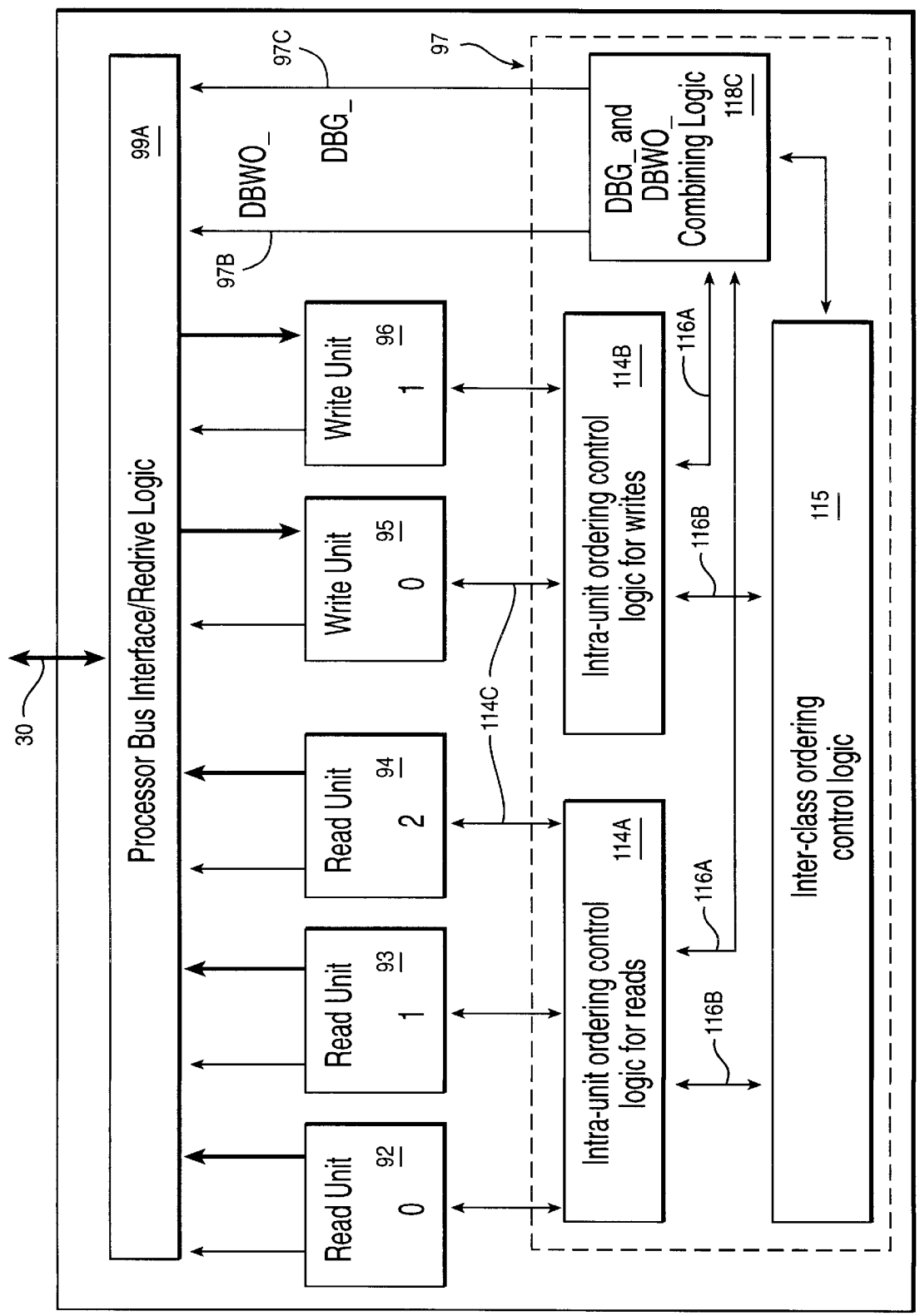
FIG. 11 is a schematic diagram illustrating in greater detail the data bus control logic unit of FIG. 9 according to the teachings of the present invention.

Reference now being made to FIG. 11, a schematic diagram is shown illustrating in greater detail the Data Bus Control Logic unit (97) of FIG. 10 according to the teachings of the present invention. The data bus control logic unit (97) includes four other components: two intra-unit ordering, control logic units (intra-class units) (114a–b), and an inter-class ordering control logic unit (inter-class unit) (115), and a DBG_and DBWO_combining logic unit (DB logic unit) (118c).

The intra-class units (114a–b) control the ordering between operations in a given class. In the preferred embodiment of the present invention, there are two such units corresponding to the two classes of operations (read and write). Those skilled in the art, however, can readily recognize that more complicated buses which use more classes of operations will require additional intraclass units (114a–b) to handle each individual class. Consequently, the preferred embodiment of the present invention is not intended to be limited to any particular number of intra-class units (114a–b).

The intra-class units (114a–b) are substantially similar for all classes of operations. The intra-class units (114a–b) communicate with the read/write units (92–96) via a series of control signals (114c) which control when a read/write unit (92–96) is allowed to use the data bus to perform its data tenure. In addition, the intraclass units (114a–b) communicate with the DB logic unit (118c).

The DB logic unit (118c) receives indications to drive DBG_(97c) and DBWO_(97b) from the individual units (92–96), and produces an overall DBG_and DBWO_signal (97c and 97b), respectively that is driven to the processor bus (30). The intra-class units (114a–b) also communicate with the inter-class unit (115) through a number of control signals (116b) in order to control the ordering of data tenures between the various classes.

The inter-class unit (115) is used to control the ordering of operations between the various classes. Only one inter-class unit (116) is used in the preferred embodiment of the present invention. The inter-class unit (115) coordinates the actions of all the intra-class units (114a–b) and, by implication, the actions of all the various Read/write units (92–96). The inter-class unit (115) insures a legal interleaving of operations between classes on the data bus.

The data bus control logic unit (97) controls the individual read/write units (92–96) by propagation of a unique "cleared" signal from the data bus control logic unit (97) to each of the individual read/write units (92–96). The cleared signal is created by the combined action of the intra-class units (114a–b) and the interclass unit (115), and takes the form of a series of conditions that must be met in order to allow a read or write unit (92–96) access to the data bus. In what follows, the cleared signals are first discussed in terms of those conditions, imposed by the intra-class units (114a–b). The individual read/write units (92–96) are controlled by the combination of conditions imposed by both the intra-class units (114a–b) and the inter-class unit (115).

Figure 12:
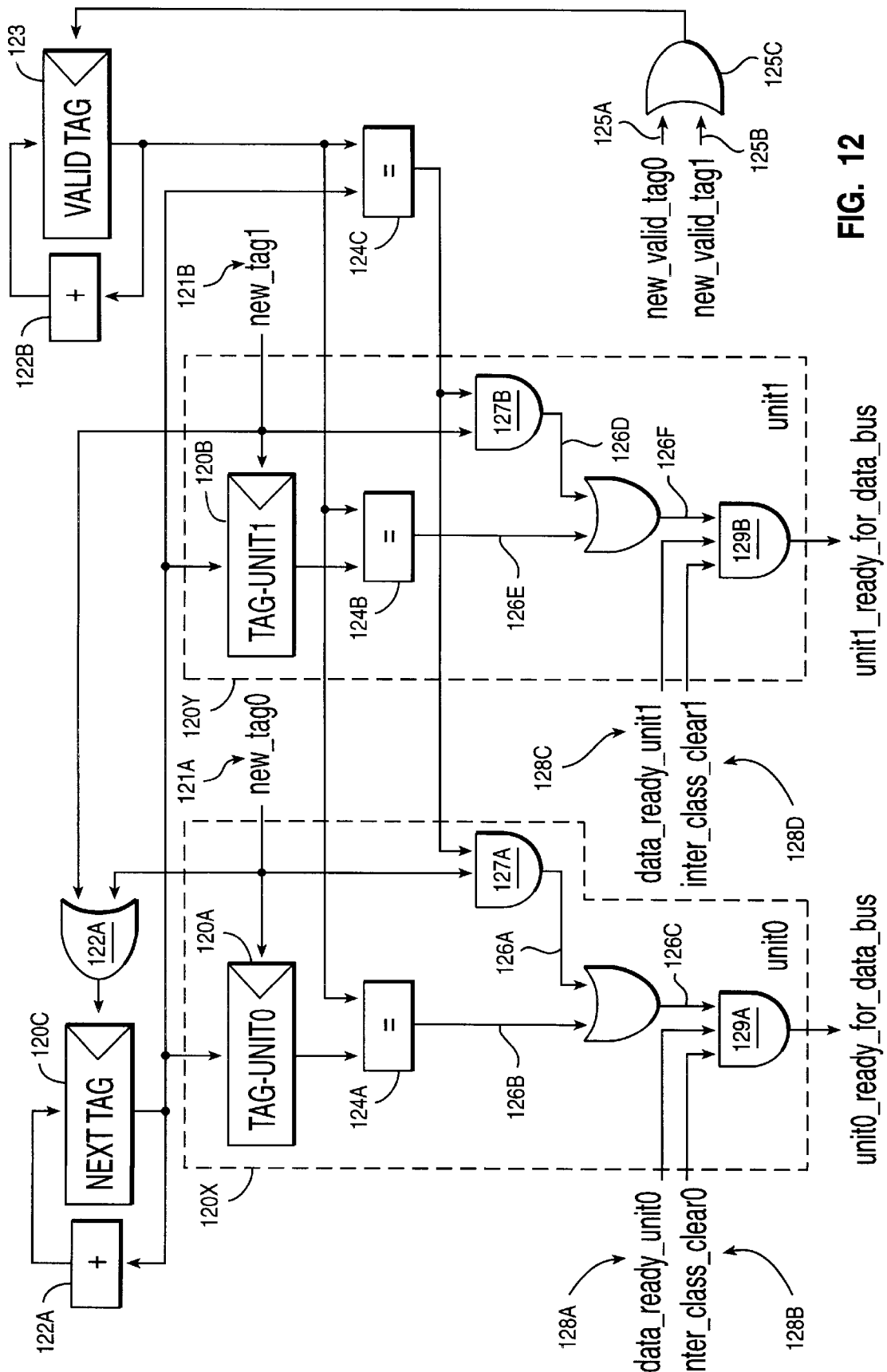
FIG. 12 is a schematic diagram illustrating in greater detail the intra-class unit of FIG. 11 according to the teachings of the present invention.

Reference now being made to FIG. 12, a schematic diagram is shown illustrating in greater detail the intra-class unit (114a) of FIG. 11 according to the teachings of the present invention. Intra-class unit (114a) is substantially similar to intra-class unit (114b), and therefore, the discussion that follows hereinafter with respect to intra-class unit (114a) is equally applicable to intra-class unit (114b) with minor variations that are clearly understandable and well known by those of ordinary skill in the relevant art.

The intra-class unit (114a), for a given class, includes a number of replicated logic structures unit0 (120x) and unit1 (120y) that have an individual tag latch (120a, 120b), respectively. In order to simplify the explanation provided in connection with intra-class unit (114a), only read units (92–93) will be discussed hereinafter.

Once again, however, it would be obvious to one skilled in the art how to extend the explanation provided herewith to support the additional read unit (94) as well as additional such units.

Upon the successful completion of an address tenure in the class controlled by intra-class unit (114a) the read unit (92–93) assigned to process the data tenure pulses a tag update signal, for example, new_tag0 or new_tag1 (121a–b), that loads a new value into the individual tag latch (120a–b) for the given read unit (92–93) from next tag latch (register) (120c). Bus operations are assigned to read units (92–93) by trivial priority selection schemes which are well known to those of ordinary skill in the art, and therefore, further discussion thereof is deemed unnecessary.

When a read unit (92–93), via corresponding unit (120x, 120y), is assigned a new tag, the next tag latch (120c) is updated concurrently to a new value in order to service the read unit (92–93) assigned to the next successful address tenure. The updates of the next tag latch (120c) are accomplished by logically ORing (122a) the logic structures update controls to form an update signal that will update the next tag latch (120c), in the event that any unit (0-1) (120x–120y) is loaded with a new value via tag latches (120a–b).

The logic responsible for computing the next state (122a) of the next tag latch (120c) can be implemented by a number of means. In example, it can be implemented using the well known binary addition function, wherein the latch value is treated as an encoded binary number, and the binary number is incremented by one via this logic. In yet another example, the logic can be implemented by a rotate function, wherein the contents of the latch bits are shifted left or right by one bit position, and the bit "shifted out" of the register is placed into the bit position on the opposite end of the register. In such an arrangement, each bit position corresponds to a unique tag value and one and no more than one bit must be active. This scheme is referred to as "one-hot" encoding. The one-hot scheme allows for a faster logic implementation.

In addition to the next tag latch (120c), another latch, valid tag (123), is provided to hold the value of the tag that is currently "valid" to take possession of the data bus. When tag latch (120a–b) value matches the value of the valid tag (123), one of the conditions for gaining ownership of the bus has been achieved.

Initially, the value of the next and valid tags (120c, 123) are made equal. The tag values of latches (120a–b) are compared to the value of the current valid tag (123) by means of comparators (124a–b). The comparator logic (124a–b) produces an equal indication when the valid tag (123) is equal to the value of tag latches (120a–b). The comparator logic (124a–b) is designed to accommodate the chosen format of the tag data. For example, if the tags are formatted as encoded by binary numbers, a bitwise comparison for equal, using techniques well known to those of ordinary skill in the art, is used. For "one-hot" tags a trivial two-level NAND-NAND logic function, which has better performance, can be used to compare the valid tag (123) to the tag latches (120a–b).

In addition to the comparators (124a–b), the next (120c) and valid (123) tags are compared directly by comparator (124c). If the next and valid tags (120c and 123) are equal, none of the read units (92–93), are currently active. This additional comparator (124c) allows the units0-1 (92–93) to determine, when starting, when any other units0-1 (92–93) of the same group are presently active one cycle earlier then would otherwise be possible.

Specifically, during the cycle when the tag latch (120a–b) is being updated, the tag latch (120a–b) value is incorrect. During this cycle, the tag latch (120a–b) is being loaded with the correct tag value from the next tag latch (120c). This cycle is denoted for the respective units0-1 (120x–y) by the activation of the new_tag0 or new_tag1 signals (121a–b); which are further used to qualify the next and valid tag (120c, 123) comparisons (124c) by AND gates (127a–b). If a unit0-1 (120x–y) is presently loading its tag latch (120a–b), and the next tag latch (120c) value equals the valid tag latch (123) value, then the particular unit0-1 (120x–y) is the only unit0-1 (120x–y), within this group, attempting to gain access to the data bus. If no other conditions prevent the unit0-1 (120x–y) from taking control of the bus, then the unit (120x–y) can be permitted to take the bus one cycle earlier then would be possible with only unit comparators (124a–b).

The condition where the unit0-1 (120x–y) is loading its corresponding tag latch (120a–b), and the next and valid tags (120c and 123) are equal is signified by signals (126a and 126d). For all cycles other than the cycle where the unit0-1 (120x–y) is loading its tag latch (120a–b), the tag latch (120a–b) is compared to the valid tag (123) to determine if the unit0-1 (120x–y) is next to obtain ownership of the data bus. This is signified by signals (126b and 126e). The logical OR of these two cases produces a signal (126c, 126f) which signifies that a particular unit0-1 (120x–y), within the group, is the next unit0-1 (120x–y) in that group to obtain ownership to the data bus. This is but one of two conditions that must be met (on an intra-group basis) to allow access to the data bus.

In addition, before a data tenure can commence, the data for the tenure must be available, either in the processor for a write, or from the cache for a read operation. For a write data tenure, the data is always ready at the processor by convention before a write address tenure is allowed to be propagated onto the address bus. However, read data tenures, by their very nature, require a variable amount of time for data to become available at the L2 cache to satisfy the processor's read request. To handle this constraint, an additional signal, data_ready_unit 0, and data_ready_unit1 (128a, 128c) are driven from each read unit (92–93) to the units0-1 (120*x–y*). This signal indicates when the data is ready for transfer (in the PowerPC 60X bus, this signal, for reads, indicates more specifically when the first beat of data is ready). For the units0-1 (120*x–y*) for writes, these signals are always active (write data is always ready in its entirety at the processor) and the signal is not propagated to AND gates (129, 129*b*).

In addition to the above noted two conditions, a number of conditions must also be met on an inter-class basis. These are the conditions that enforce the proper ordering of operations between classes. For each read unit (92–93), the inter-class unit (115 of FIG. 11) propagates an "inter-class cleared" signal (128*b,* 128*d*) for each read unit (92–93). This signal indicates that the read unit (92–93) is allowed to take control of the data bus based on the inter-class ordering constraints.

Once all three conditions: inter-class ordering conditions are met, the tag value is correct, and the data is ready, a read unit (92–93) is allowed to take ownership of the data bus. Once a read unit (92–93) achieves ownership of the data bus, the read unit (92–93) will transfer the data for its particular data tenure, and then update the valid tag register (123) (equal to its own tag during the data transfer) in order to pass control (within this group) of the data bus to the unit (92–93) next to use the data bus. The above is accomplished by each read unit (92–93) driving a control signal, new_valid_tag0, new_valid_tag1 (125*a–b*) which are ORed (125*c*) and used to update the value of the valid tag (123). The next state logic for the valid tag (122*b*) is equivalent to that for the next tag (122*a*).

In this manner, the units0-1 (120*x–y*) sequence individual read units (92–93) onto to the data bus by assigning each read unit (92–93) a unique tag from the next tag (120*c*) and allowing particular read units (92–93) to proceed to a data bus when their tags (via units0-1 (120*x–y*)) are "valid" (compares correctly with the next or valid tags (120*c,* 123) at the proper time relative to the loading of the tag latch (120*a–b*)).

Once again, although FIG. 12 shows an intra-class unit (114*a*) capable of coordinating two read units (92–93), those skilled in the relevant art will readily recognize that the general structure can be expanded to handle any number of read units (92–93) by adding replicated logic units such as unit0-1 (120*x–y*).

Figure 13:
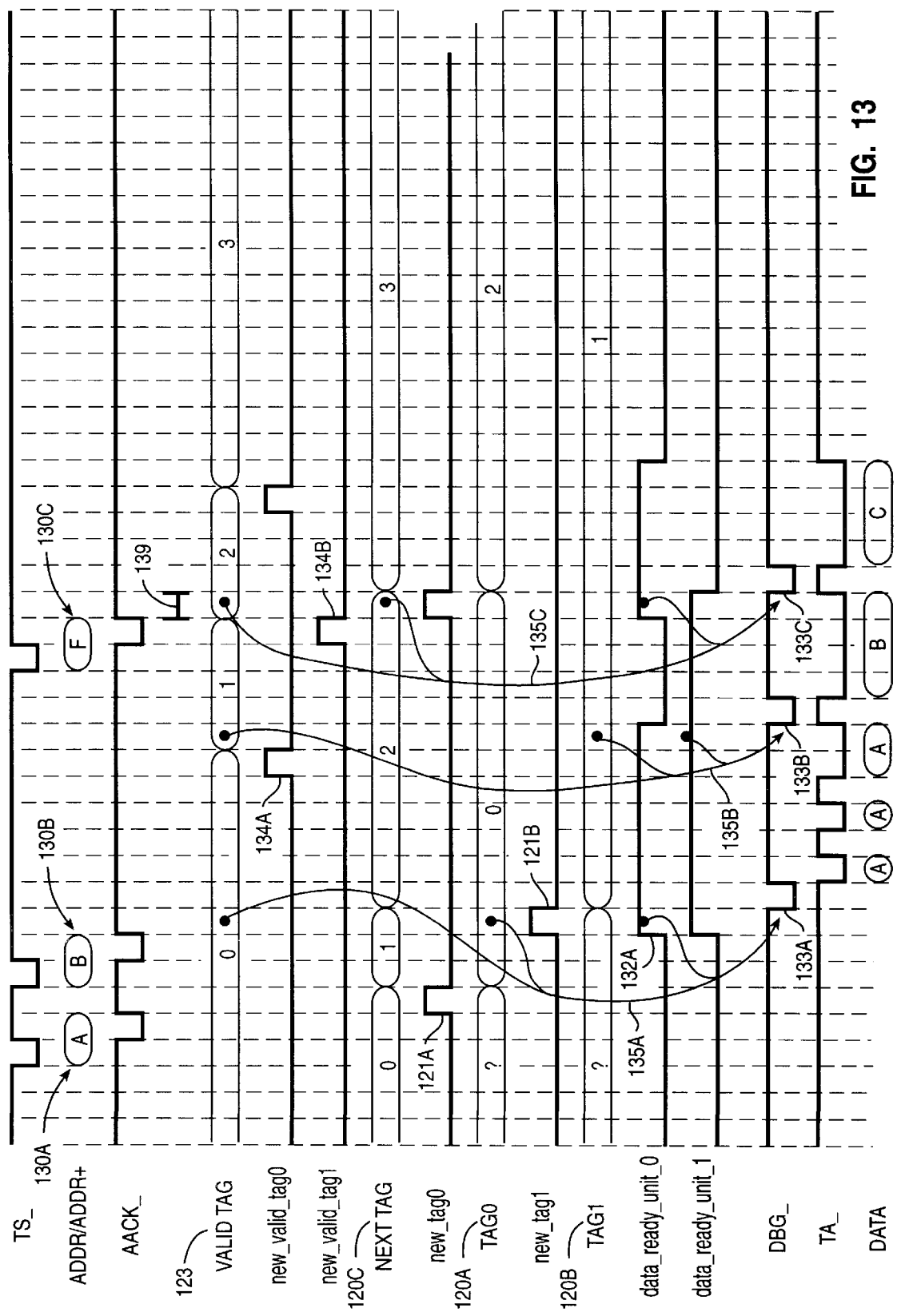
FIG. 13 is a timing diagram illustrating exemplary read transactions as processed by the intra-class unit of FIG. 12 according to the teachings of the present invention.

Reference now being made to FIG. 13, a timing diagram is shown illustrating signals generated and used by the inter-class unit 115 of FIG. 11 according to the teachings of the present invention. In this example, it is assumed that write operations are not present, and therefore, that inter-class conditions do not affect the read units (92–93) attempting to gain ownership of the bus.

Three read operations (130*a–c*) are shown. The next_tag, and valid_tag values (120*c,* 123) are shown initialized to a value of zero. The values for the tags of the individual units0-1 (120*x–y*) initially contain an unknown value. The first read operation shown is assigned to read unit (92). Also for this example, the data for this read is not initially ready (data_ready_unit0 inactive). Once read unit (92) detects that the operation will not be retried, it activates a new_tag0 signal (121*a*) which causes the next tag (120*c*) to be updated, and the tag latch (120*a*) to be loaded with the current next tag (120*c*) value: 0.

For this operation, the next tag and valid tag latches (120*c,* 123) have the same value during the cycle that the tag latch (120*a–b*) for unit (92) was being loaded. Also after the tag latch (120*a–b*) for unit (92) is loaded, the tag latch (120*a–b*) value and the valid tag (123) value match. Therefore, the tag matching portion of the control apparatus of FIG. 12 has been valid for this particular transaction, and the data_ready_unit0 signal is what has prevented this read operation from preceding directly to the data bus. Once the data_ready_unit0 signal becomes active, unit (92) will proceed to use the data bus.

Before the data_ready_unit0 signal becomes valid, the second read operation (130*b*) is presented onto the address bus, and is assigned to read unit (93). Read unit (93) activates the new_tag1 signal (121*b*) causing the tag latch (120*b*) to be loaded with the current next tag (120*c*) value of one, and the next tag (120*c*) to be updated to a value of two. Note that for this operation, unlike the first read operation, the value of the next tag (120*c*) does not equal the value of the valid tag (123) during the cycle on which the tag latch (120*b*) was loaded. Therefore, the intra-class unit (114*a*) prevents read unit (93) from acquiring control of the data bus until read unit (92) has updated the valid tag latch (123) to match the tag latch (120*b*) value assigned to unit (93). Note that the data_ready_unit1 signal went active immediately for this read operation, but that read unit (93) was prevented from acquiring the data bus due to tag mismatches.

Once the data_ready_unit0 signal goes active (132*a*), read unit (93) has met all of the intra-unit requirements (135*a*) for acquiring ownership of the data bus and drives the DB logic (118*c* of FIG. 11) the next cycle (133*a*). Once read unit (92) has acquired the bus by driving the DBG_signal, the four data tenure beats signified by the TA_signal are driven to transfer the data. This first data tenure is shown with dead cycles interspersed between actual data beats. The number of and positions of these dead cycles, if present, varies from transactions to transaction.

During the cycle before the last TA_signal for the data tenure, unit (92) activates the new_valid_tag0 signal (134*a*). This in turns causes the valid tag (123) to be updated to its next value, 1, via logic (122*b*). In essence, this signifies that read unit (92) has finished with the data bus, and is passing control to the read unit (92–93) scheduled to next use the data bus.

Once the valid tag (123) value is updated, read unit (93) achieves all of the intra-unit requirements necessary to acquire the data bus (135*b*), and drives the DBG_signal (133*b*) to start the data tenure of the next cycle. After the data tenure for the second read operation is completed, unit (93) activates the new_valid_tag1 signal (134*b*) which updates the valid tag (123) value to equal two.

The final read address tenure (130*c*) occurs just as the valid tag (123) value is being updated. This final read is assigned to unit (92) which has completed the first read operation. The first cycle that the valid tag (123) value is two (139), is the same cycle that read unit (92) is loading tag latch (120*a*) from next tag (120*c*). During this cycle, the valid and next tag values (123, 120*c*) match, and therefore, read unit (92) meets all of the intra-unit conditions necessary to acquire ownership of the data bus (135*c*) (i.e. tags match and the data_ready signal is active). During the next cycle, read unit (92) drives the DBG_signal (133*c*) and takes possession of the bus to perform the data tenure. This read is able to be processed by read unit (92) one cycle earlier than would be possible if only the individual tags (120*a–b*) were compared to the valid tag (123). Read unit (92) would have been stalled an extra cycle waiting for the tag latch (120*a*) to be loaded before it could have been cleared to take ownership of the data bus. By directly comparing the next and valid tags this delay is avoided.

FIG. 13 is a timing diagram illustrating an example of the execution of the intra-class unit (114*a*) of FIG. 11 for read operations according to the teachings of the present invention. Those skilled in the relevant art would readily recognize that the intra-class unit (114a) for write operations would, essentially, be identical to that shown in FIG. 13, with the exception that data tenures occur without interspersed dead cycles, and there are no data_ready signals. For writes, all data, by convention, is ready as soon as the processor places the write address tenure onto the bus.

To summarize, the intra-class ordering control logic unit (114a) controls the progress of operations within a class to the data bus by means of tags. A separate tag is maintained for each read unit (92–93), and is loaded from a next tag latch (120c) which is updated each time tag latches (120a–b) are loaded. Tags latches (120a–b) are compared to a valid tag latch (123) to determine when a read unit (92–93) is allowed to access the data bus. Once the tag latch (120a–b) matches the valid tag (123), the read unit (92–93) is ready to access the bus (assuming the data is ready for reads). To allow read units (92–93) access to the data bus one cycle earlier then would otherwise be possible, the next tag (120c) and valid tag (123) values are also compared directly. If, while loading a tag latch (120a–b), the next and valid tags (120c, 123) are equal, and the other conditions necessary for bus ownership are met, the read unit (92–93) is allowed to acquire control of the data bus immediately.

The PowerPC 60X protocol allows a mode known as "fast-L2 mode" in which the TA_'s for different read data tenures can be executed back-to-back without an intervening cycle for the DBG_ of the second data tenure. Although not specifically illustrated in FIG. 13, the present invention fully supports this mode.

Specifically, to allow for fast-L2 operations, a read unit (92–93) would pulse its new_valid_tag signal one cycle earlier than shown in FIG. 13. This allows any subsequent reads to acquire the data bus one cycle earlier. This in turn causes the DBG_ for the subsequent read data tenure to occur during the same cycle as the last TA_ of the preceding tenure. The TA_ for the first beat of the subsequent data tenure will occur the next cycle. This causes the data tenures to be "streamed" together without an intervening dead cycle.

In addition to the intra-class constraints, each read unit (92–93) must satisfy inter-class constraints in order to obtain access to the data bus. For example, if a read operation occurred after a write operation, and both are outstanding to gain ownership of the data bus, then the read operation following the write is not allowed to proceed until the write operation is completed.

In contrast, if a write operation occurs after a read operation, both are waiting to gain ownership of the data bus, then the write operation is not prevented from taking control of the data bus. However, the write unit (95–96) must assert the DBWO_ signal with the DBG_ signal in order to inform the processor to use the data tenure for the write operation instead of the longer outstanding read operation.

To allow the inter-class unit (115) to manage these constraints, each read or write unit (92–96) presents three signals to the inter-class unit (115). The first of these signals is an indication that the unit (92–96) is the current owner of the data bus. When a unit (92–96) achieves all the conditions necessary to obtain data bus ownership, the unit (92–96) drives DBG_ for one cycle and coincidentally activates a "data bus busy" signal. The data bus busy signal is held active up to and including the cycle before the last TA_ on the bus for the data tenure. This signal is used to keep units (92–96) in other classes from colliding with the current unit (92–96) while it is in possession of the data bus.

The second of these signals is a "pending" signal. The pending signal is used to indicate that a unit (92–96) has been assigned to process a data tenure, but has not yet obtained access to the data bus. These pending flags are used by the inter-class unit (115) to determine, for each unit (92–96), if any active unit (92–96) in another class whose address tenure occurred earlier then the current unit (92–96), is currently waiting to gain ownership of the data bus. If so, the inter-class unit (115) takes the appropriate action based upon the classes of the units (92–96) involved.

The final signal is a unit "idle" indication. The idle signal indicates whether a unit (92–96) is "idle" or processing an operation. The idle signal is used by the inter-class unit (115) to control the monitoring of pending "signals" as described hereinafter.

Figure 14:
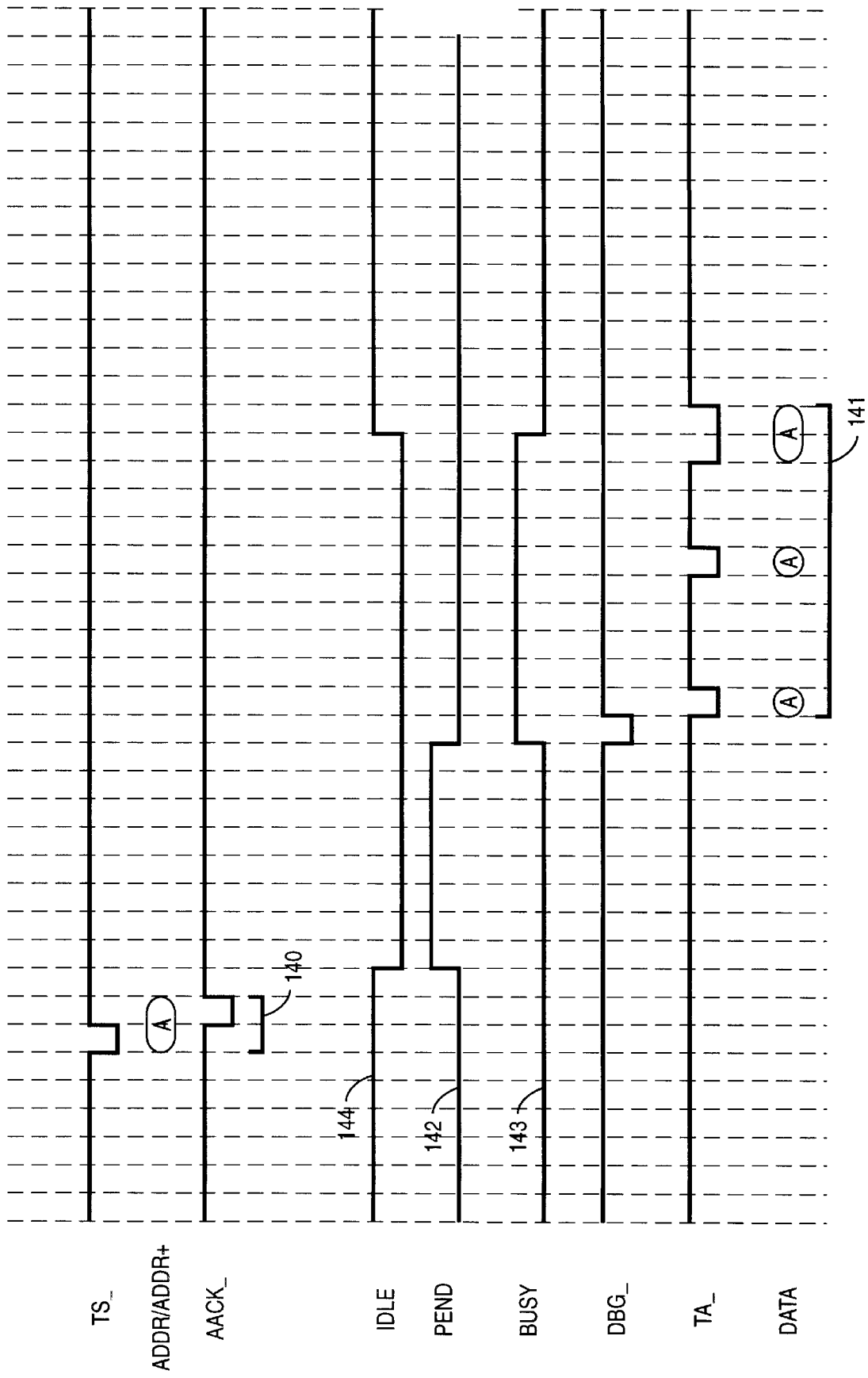
FIG. 14 is a timing diagram illustrating signals generated and used by the inter-class unit of FIG. 11.

Reference now being made to FIG. 14, a timing diagram is shown illustrating a read data tenure with pending (142), busy (143), and idle (144) signals according to the teachings of the present invention. The read address data tenure (140) is followed by its respective data tenure (141). The read unit0-2 (92–94) assigned to process this operation will drive the pending signal (142) from two cycles after AACK_ (if there is no retry) up to, by not including the cycle the read unit (92–94) takes control of the data bus.

The pending signal (142) serves as a notification that the read unit (92–94) has been assigned to carry out an operation, but has not yet gained control of the data bus. When the assigned read unit (92–94) gains control of the data bus, the assigned read unit (92–94) deasserts the pending signal (142), and asserts the busy signal (143). The busy signal (143) remains active up to and including, the cycle before the last TA_ of the data tenure. The busy signal (143) serves as an indication that the data bus is currently owned by the assigned read unit (92–94).

Finally, the idle signal (144) is active until the read unit (92–96) is assigned to the operation. Once the data tenure has completed, the read unit (92–96) releases the idle signal (144), and returns to an idle state awaiting an assignment to a future operation.

The inter-class unit (115) uses the above three signals (idle, pending, and busy) from each unit (92–96) in order to enforce the ordering constraints between units (92–96) in different classes. For each unit (read and write) (92–96), the inter-class unit (115) produces a "inter-class cleared" signal. The inter-class cleared signal indicates that the selected unit (92–96) has met all the conditions, on an inter-class basis, necessary to take ownership of the data bus. These signals are then propagated back to the intra-class control logic units (114a–b), and used to form the overall "cleared" signals that grant ownership of the bus to each individual unit (92–96) The constraints necessary between classes to control ownership of the data bus fall into two major cases for the PowerPC 60X bus.

The first constraint is to prevent units (92–94) of one class from colliding on the data bus with units (95–96) of a different class. The intra-class units (114a–b) prevent units (92–96) within the same class from colliding with a unit (92–96) already in possession of the data bus by the timing of the update of the valid tag (123).

To prevent units (92–96) in different classes from colliding on the data bus, the inter-class unit (115) logically ORs the individual busy signals from the units (92–96) in the various classes to form overall "class data bus busy" signals.

For example, in the preferred embodiment of the present invention, as illustrated in FIG. 11, the three read unit (92–94) busy signals are ORed to produce a "data bus busy with reads" signal. Likewise, the two busy signals for the write units (95–96) are logically ORed to produce a "data bus busy with writes" signal. The above noted class busy signals are then used to prevent any operation from a unit (92–96) from another class from gaining ownership of the data bus. Hence, if the "data bus busy with writes" signal is active, then all read units (92–94) will be prevented from gaining ownership of the data bus and vice versa.

The second major constraint that the inter-class unit (115) enforces is the prevention of operations from different classes from bypassing one another and taking ownership of the data bus in a disallowed order. For example, a read operation that follows write operations cannot take possession of the data bus until all previous write operations are completed on the bus.

Write operations can take possession of the data bus if read operations that occurred earlier than the write operation are pending, but the write unit (95–96) must assert DBWO__ to inform the processor that the data tenure is for the write instead of the read that is currently schedule to obtain ownership of the data bus. To keep units (92–96) from obtaining the bus in an improper order, the inter-class unit (115) maintains, for each unit (92–96), flags that indicate the pending flag status of all units (92–96) in classes other than the given unit's class. These flags are referred to hereinafter as "tainted flags".

For example, in the preferred embodiment of the present invention, for every read unit (92–94), two tainted flags are maintained to track the pending status of the write units (95–96). Likewise, for each write unit (95–96), three tainted flags are provided to track the pending status of the read units (92–94).

A given unit's (92–96) tainted flags are set when that unit (92–96) is idle, as indicated by the unit (92–96) idle signal (144), and a pend flag of a unit (92–96) in another class becomes active. Once the given unit (92–96) becomes active, the tainted flags are not set again until the current unit (92–96) returns to the idle state.

Any pending flags for the units (92–96) in other classes that go active while the given unit is already active are for operations that occur after the given units address tenure, and do not directly affect the given unit obtaining ownership of the data bus. The tainted flags for the given unit are reset as the pend flags for the monitored unit go inactive.

In other words, the tainted flags are reset as the operations outstanding before the current unit have obtained control of the bus. Once the other units have gained ownership of the data bus, their individual "data bus busy" signals will prevent the current unit from colliding on the bus until they have completed. Once all the tainted flags go inactive, the current unit is insured that all previous operations from units in other classes have obtained ownership of the bus and no longer keep the present unit from obtaining ownership of the data bus. The individual tainted flags are ORed together to produce an overall tainted indication for each unit (92–96).

Figure 15:
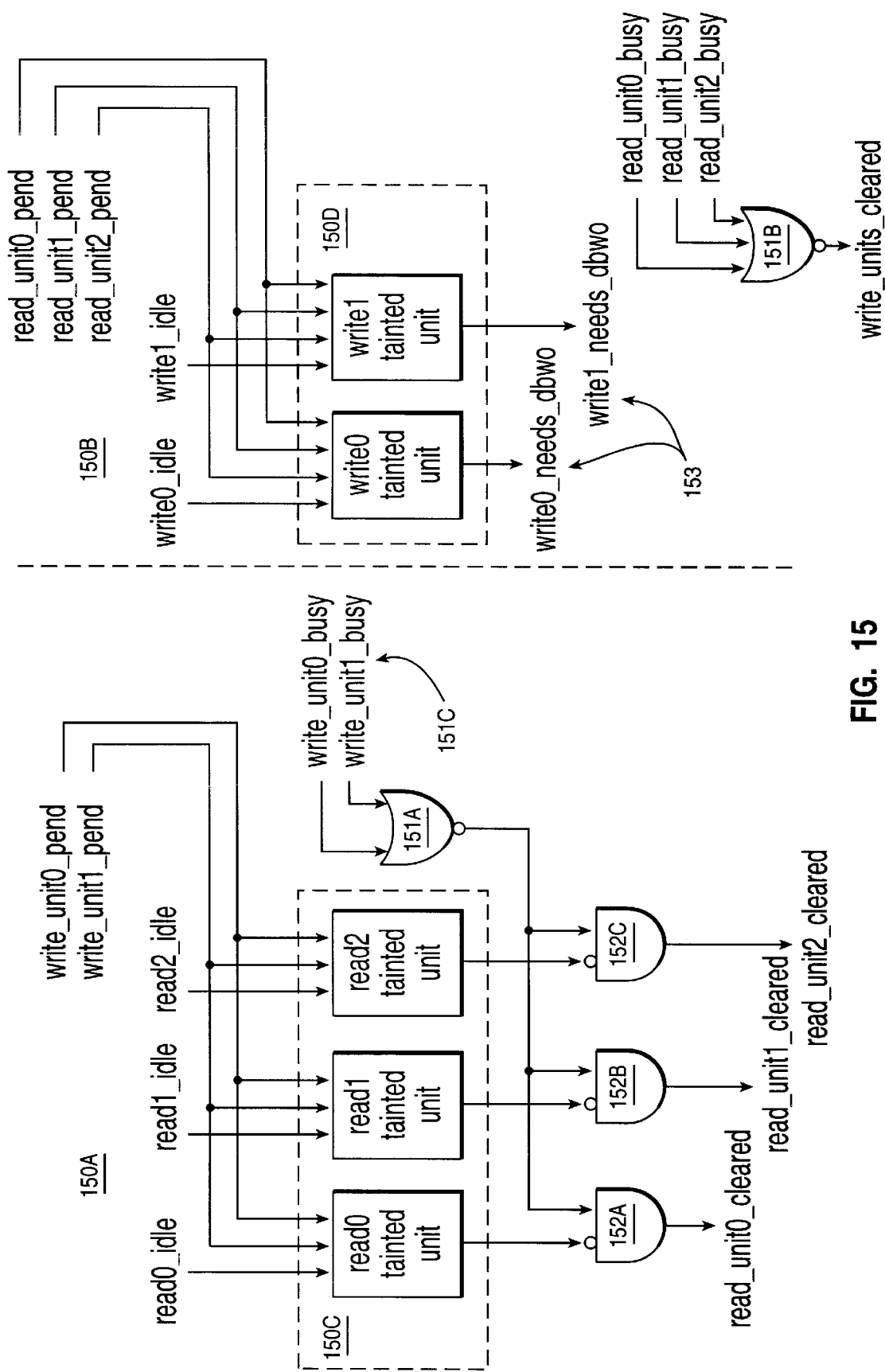
FIG. 15 is a schematic diagram illustrating in greater detail the inter-class unit of FIG. 11 according to the teachings of the present invention.

Reference now being made to FIG. 15, a schematic diagram is shown illustrating in greater detail the inter-class unit (115) of FIG. 11 according to the teachings of the present invention. In the preferred embodiment, the inter-class unit (115) is configured to control three read units (92–94) and two write units (95–96). The inter-class unit (115) is divided into two distinct halves.

The first half (150a) is for controlling the access of the read units (92–94) to the data bus, and a second half (150b) for controlling the access of the write units (95–96) to the data bus. Within each of these divisions (halves), repeated logic structures are provided to enforce the inter-class ordering constraints for the particular class. Both the read and write control logic have a number of tainted units (150c, 150d) which are responsible for maintaining the tainted flags for the individual read and write units (92–96).

The tainted units (150c, 150d) produce a "tainted" indication for each unit (92–96).

In addition to the tainted units (150c, 150d), NOR gates (151a–b,) produce a not "class busy" signal. For example, NOR gate (151a) produces an active signal if, and only if, neither write unit's (95–96) write busy signal (151c) is active. If neither write unit's (95–96) busy signal is active, then the read units (92–94) have achieved one of the inter-class constraints conditions necessary to be allowed to obtain ownership of the data bus.

The other condition necessary for a given read unit (92–94) to obtain ownership, is that a read unit (92–94) should not be "tainted" by one or more write units (95–96) waiting to obtain access to the data bus. The read tainted units (150c) determine if a given unit is "tainted" by one or more write units (95–96). If a given read unit (92–94) is not tainted, the corresponding tainted unit (150c) produces an inactive signal which is inverted and processed by AND gates (152a–c) to produce a "cleared" indication for each individual read unit (92–94). The cleared signals (152a–c) indicate that the corresponding read unit (92–94) can proceed to take ownership of the data bus from the point of view of the inter-class ordering constraints, and is propagated to the intra-class unit (114a) in order to produce the overall "cleared" signal granting ownership of the data bus to the given read unit (92–94).

The inter-class ordering constraints for write units (95–96) differ from those for read units (92–94). Write units (95–96) are not disqualified for obtaining ownership of the data bus if they are tainted by pending read operations. However, if a tainted write unit (95–96) takes ownership of the data bus, it must drive DBWO__to indicate that the data tenure is to be used for a write instead of the current outstanding read. To properly control the DBWO__signal, the outputs of the write tainted units (153) are used when a write unit (95–96) is tainted, and would therefore need to assert DBWO__if taking ownership of the data bus. The signals are propagated to the DBG__combining logic (118c of FIG. 11), and used to drive the DBWO__signal (97b).

While write units (95–96) are permitted to gain ownership of the data bus, even if tainted by pending read operations, write units (95–96) cannot gain ownership of the data bus, if a read unit (92–94) is currently in possession of the bus. Therefore, nor gate (151b) produces a class "not busy" signal that is active, if, and only if, no read unit (92–94) is currently in possession of the data bus.

Unlike the read units, (92–94) which have individual unit cleared signals (152a–c), the cleared signal (151b) serves as a cleared indication for all write units (95–96). The only inter-class condition that constrain write units (95–96) from gaining ownership of the data bus is if a read unit (92–94) is the current owner of the data bus. This condition is common to all write units (95–96) and a common cleared signal is therefore used for all write units. If no read unit (92–94) is currently using the data bus, then all write units (95–96) are cleared to gain ownership from an inter-class constraint perspective.

Figure 16:
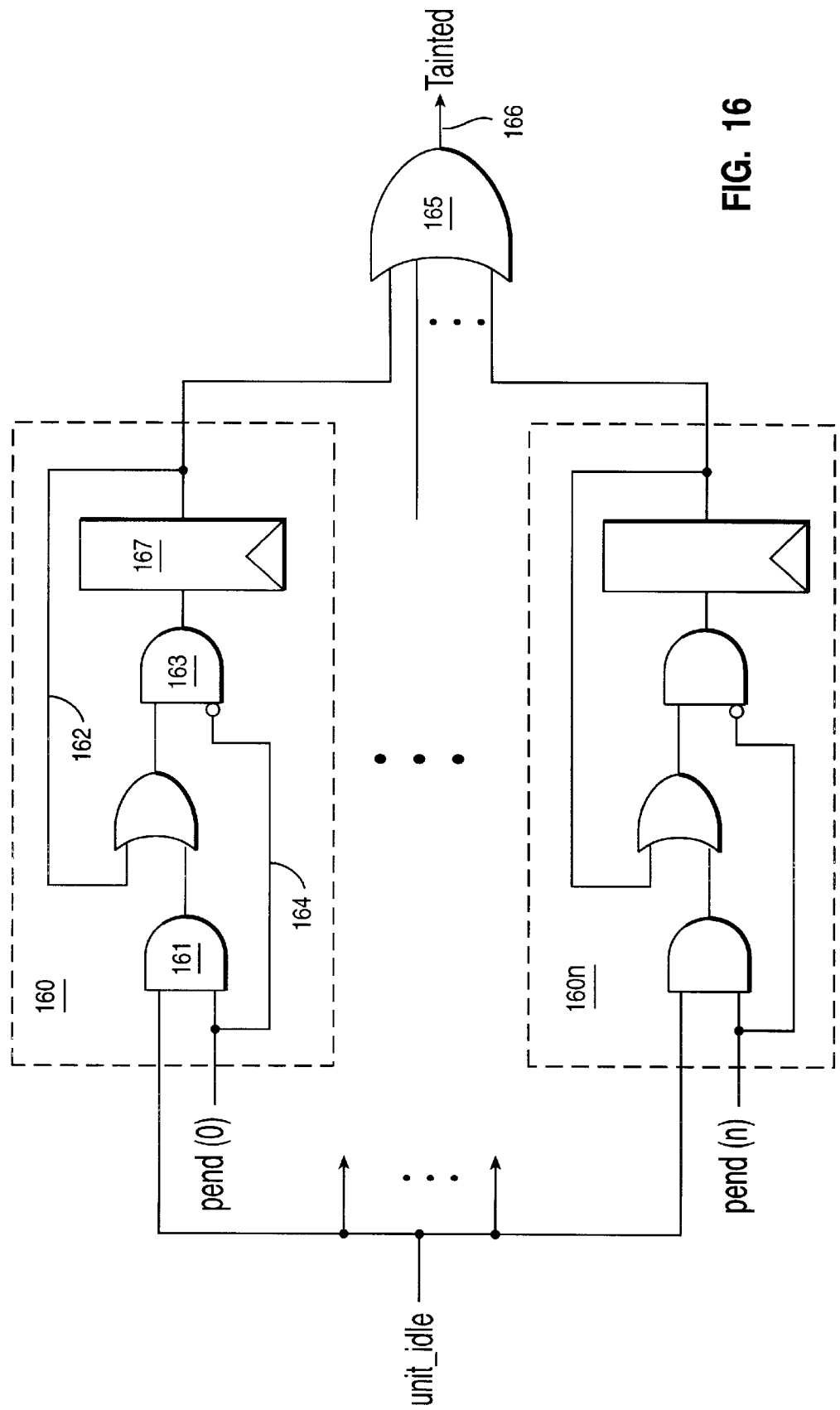
FIG. 16 is a schematic diagram illustrating in greater detail one of the tainted units of FIG. 15 according to the teachings of the present invention.

Reference now being made to FIG. 16, a schematic diagram is shown illustrating in greater detail one of the tainted units (150c–d) of FIG. 15 according to the teachings of the present invention. In general, a tainted unit (150c–d) includes a number of replicated logic structures (160-n) to maintain the status of the various tainted flags for the corresponding unit (92–96). Each logic structure (160-n)

includes a latch (167) to hold the status of the tainted flag, and the necessary logic (161–164) to set/reset the latch (167).

As described hereinbefore, an individual tainted flag is set when the corresponding unit (92–96) is idle, and a pending signal from one of the monitored units (92–96) becomes active. This condition is signified by an active output of AND gate (161). Once set, the individual tainted flags holds its value by means of a feedback path (162) until reset. Finally, the individual tainted flag is reset when the pending signal goes inactive. This is accomplished by inverting the pend signal (164) to serve as a reset term to And gate (163) driving the tainted flag latch (167). Each individual tainted flag indicates whether or not the corresponding unit (92–96) is tainted by the particular monitored unit (92–96). The individual tainted flags are logically ORed by gate (165) to produce an overall tainted indication (166) for the corresponding unit (92–96).

Figure 17:
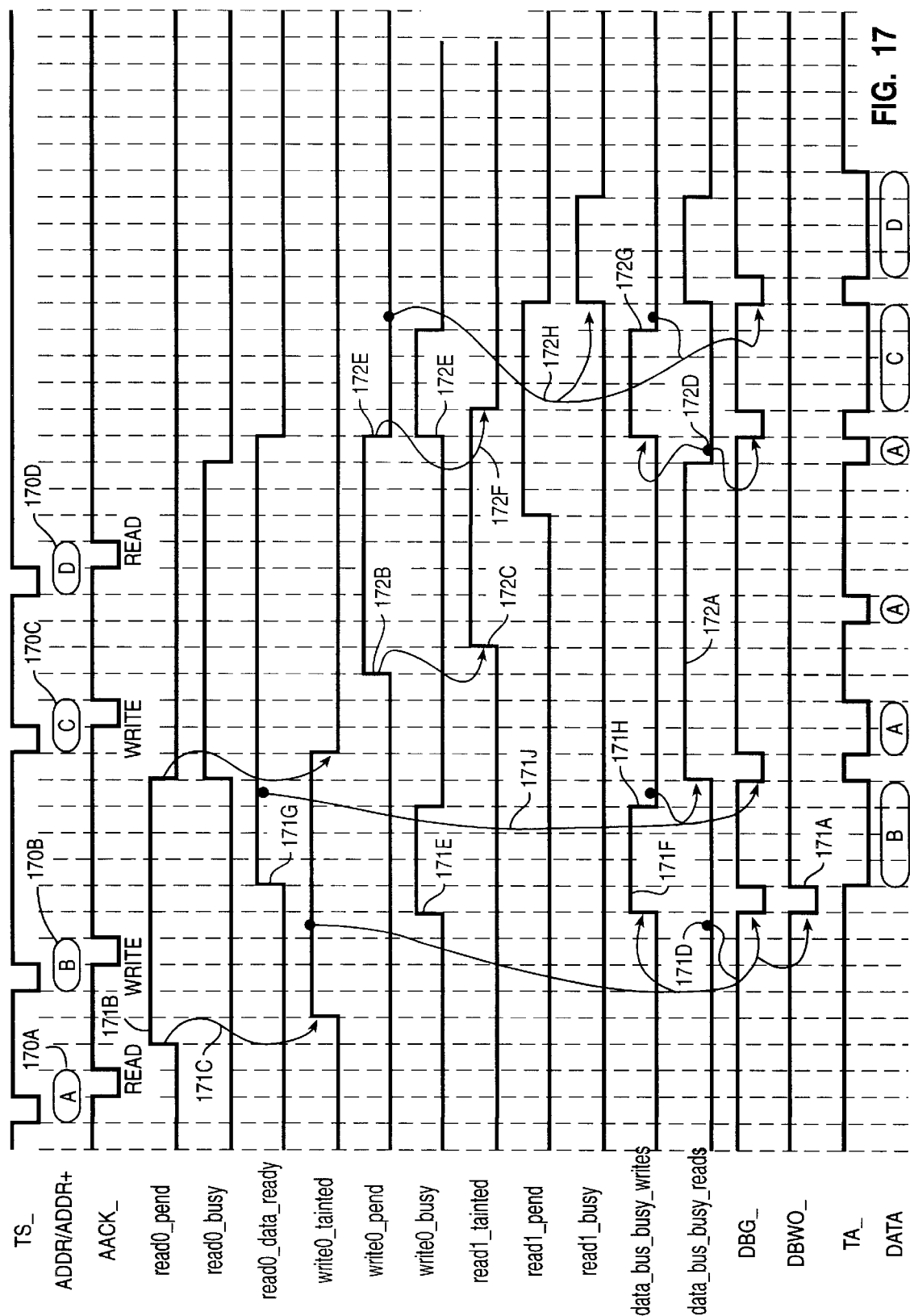
FIG. 17 is a timing diagram illustrating the operations processed by inter-class unit of FIG. 11 according to the teachings of the present invention.

Reference now being made to FIG. 17, a timing diagram is shown illustrating operations processed by inter-class unit (115) of FIG. 11 according to the teachings of the present invention. Specifically, operations are shown: two reads and two writes.

The first operation (170a) is a read that is prevented from accessing the data bus because the data for the read unit (92–94) is not ready (read_data_ready inactive). The read unit assigned to read (170a) raises its corresponding pending flag (171b) to indicate that the read unit (92–94) is pending awaiting data.

The activation of the pending signal for the read unit (92–94) causes the write unit's (95–96) tainted flags (171c) to go active once cycle later (due to the latch in the tainted unit).

Before data becomes available to satisfy read operation (170a), a write operation occurs (170b), and is assigned to write unit (95). Since no read units (92–94) are currently in possession of the data bus (data_bus_busy_reads inactive-171d), the write unit (95) is immediately cleared to take ownership of the data bus. However, since the write unit (95) is tainted by the outstanding read operation (170a), the write unit (95) asserts DBWO (171a) with DBG_to indicate to the processor that this data tenure is to be used for the outstanding write (170b) instead of the outstanding read (170a). The write unit (95) takes ownership of the bus, and activates write0-busy (171e) which in turns causes the data_bus_busy writes signal to be activated (171f) preventing any read unit (92–94) from gaining ownership of the data bus.

After the write data tenure commences, read0_data_ready becomes active (171g). However, the read unit (92) is prevented by the inter-class control logic unit (115) from taking ownership of the data bus until the data_bus_busy_writes signal goes inactive (171h). Once this condition occurs, the read unit (92) takes ownership of the data bus (171j), and begins to process the data tenure for read (170a).

The next subsequent operation is a write operation (170c). The write operation (170c) is prevented from obtaining ownership of the data bus by the inter-class unit (115). Specifically, the data bus is still currently owned by read unit (92) for a data tenure (172a), and this prevents the write unit from obtaining control of the data bus. Therefore, the write unit (95) assigned to process this operation raises its pending flag (172b). The assigned write unit (95) cannot gain control of the data bus until the data tenure for read (170a) completes, and relinquishes ownership of the data bus.

Before the data tenure for read (170a) completes, the read operation (170d) is presented onto the bus. This read operation is assigned to read unit1 (93) (read unit0 (92) is still processing data tenure for read 170a). For this example, it is assumed that the data is ready immediately to satisfy this request (the read1___data ready signal is not explicitly shown).

The read operation (170d), however, is prevented from obtaining control of the data bus for two reasons. First, the intra-class unit (115) will prevent read unit (93) from obtaining control of the data bus until read unit (92) has completed its data tenure.

Second, read unit1 (93) is tainted (172c) by write unit0 (95) via signal write0_pend (172b). Therefore, read unit1 (93) will not be able to obtain control of the data bus until both the read data tenure for read (170a), and the write data tenure for write (170c), have completed.

Reads are not allowed to bypass previous writes. In contrast to the situation for write (170b), the tainted condition for read unit1 (93) prevents it from obtaining control of the data bus.

Once the data tenure for read (170a) completes, write unit0 (95) gains control of the data bus (172d) to process the data tenure for write (170c). When gaining control of the data bus, write unit0 (95) releases its pending flags and activates its busy flag (172e). Once the pending flag is released, the tainted condition for read unit1 (93) is released one cycle later (172f).

Once the tainted condition is released, however, read unit1 (93) still cannot obtain control of the data bus due to the active data_bus_busy_write signal (172g) (indicating that write unit0 (92) is currently in possession of the data bus). Once the write data tenure completes, the write unit0 (95) releases its busy signal which in turns allows read unit1 (93) to obtain control of the data bus (172h). Read unit1 (93) then releases its pend signal, raises its busy signal, and processes the data tenure for read (170d). Once the data tenure is complete, read unit1 (93) releases its busy signal, and returns to the idle state.

By the combined action of the tainted units (150c–d), and the class busy signals, data_bus_busy_writes, and data_bus_busy_reads, the intra-class unit (115) is able to manage inter-class ordering constraints. These constraints fall into two main groups: preventing collisions on the data bus between units of different classes, and managing re-ordering of operations between classes. The logic-implementing the inter-class ordering unit (115) can be altered to suit the particular ordering constraints of the partially-in-order bus to be controlled.

Figure 18:
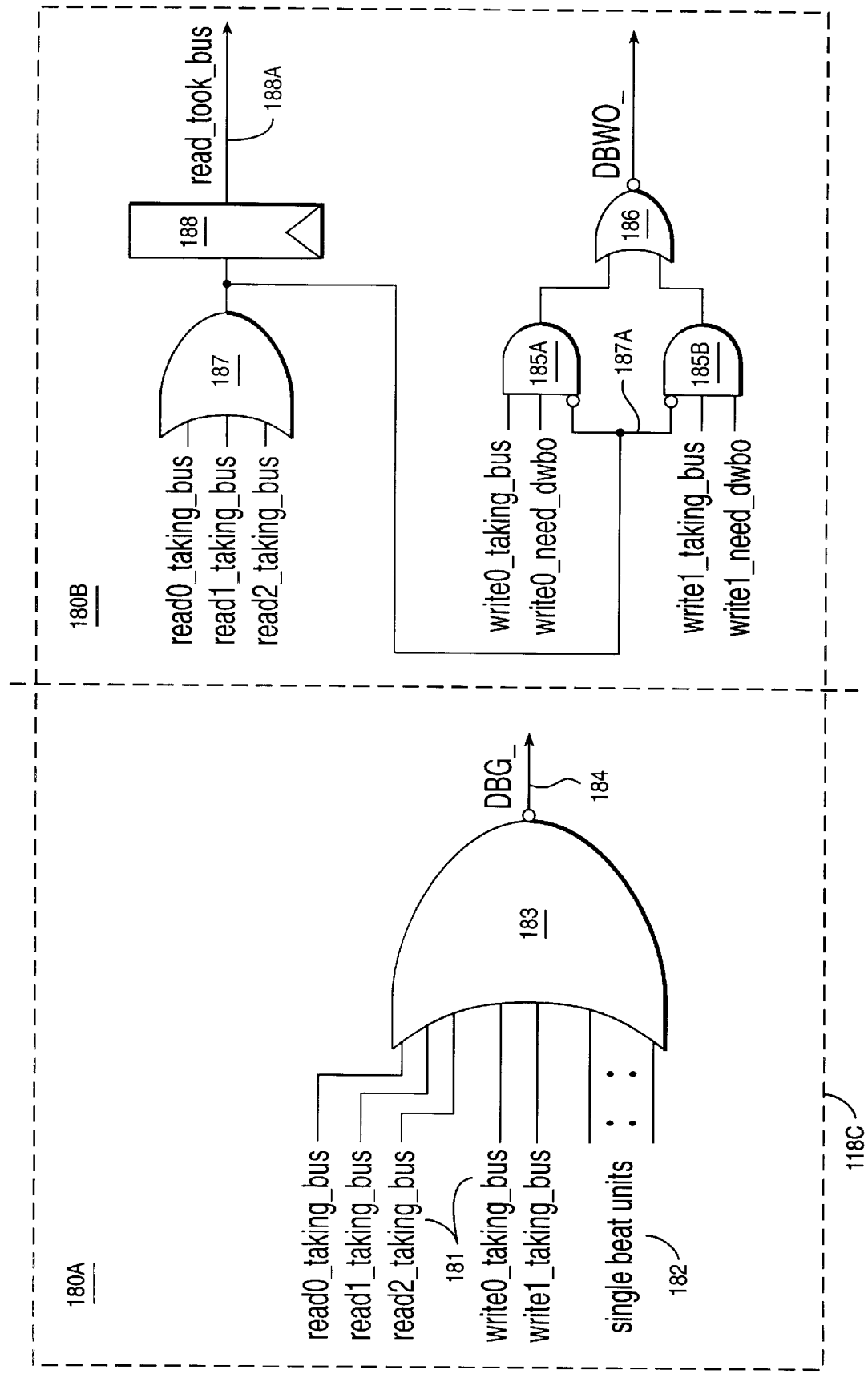
FIG. 18 is a schematic diagram illustrating a greater detail the DBG__and DBWO__combining logic unit (DB) unit of FIG. 11 according to the teachings of the present invention.

Reference now being made to FIG. 18, a schematic diagram is shown illustrating in greater detail the DB unit 118c of FIG. 11 according to the teachings of the present invention. In general, the DB unit (118c) is responsible for taking the various signals from the individual read and write units (92–96) and driving the DBG_and DBWO_signals (97b–c) onto the processor bus via bus interface/redrive logic (99a). The DB unit (118c) is divided into two sections: one for producing a DBG_signal (180a), and another for producing a DBWO_signal (180b).

In the preferred embodiment of the present invention the DB unit (118c) is configured to control three read units (92–94) and two write units (95–96). Though not explicitly shown in FIG. 12, each unit (92–96) produces an active high "taking bus" signal (181) that is routed through the intra-class units (114a–b) to the DBG unit (118c). In addition, the state machines used to control the single beat operations, although not controlled directly by the preferred embodiment of the present invention, also produce "taking" bus signals (182) that are routed directly to the DBG unit (118c).

All of these signals are processed by NOR gate (183) to produce the DBG__signal (184) driven to the processor bus interface/redrive unit (99a) which latches the DBG__signal (184) and presents it on the data bus.

To drive DBWO__, the DBG unit (118c) uses the inter-class logic unit (114a–b) "needs DBWO__" signals from the write tainted units (150d) in cooperation with the write "taking bus" signals to determine if a write unit (95–96) must drive DBWO__concurrently with DBG__.

The logic structure necessary to drive DBWO__is somewhat more complicated than DBG__. This is due to the necessity of handling a special case with respect to DBWO__. Consider a series of operations where a read operation, with no other outstanding operations, obtains control of the data bus, and takes an extended period of time to complete its data tenure. Further, assume a read address tenure followed by a write address tenure occur while the data tenure for the initial read is being processed. The second read operation will be assigned to a distinct read unit, and will be prevented from gaining ownership of the data bus until the first read unit has completed processing the initial read data tenure, and updated the valid tag latch (123).

The write operation will be assigned to a write unit (95–96) and will be tainted by the second read operation. This will not, however, prevent the write unit from obtaining ownership of the bus, but will rather cause the write unit (95–96) to attempt to drive DBWO__coincident with DBG__ when it attempts to gain ownership of the bus. However, the write unit (95–96) will be prevented from gaining ownership of the data bus while initial read data tenure is present on the data bus.

Once the initial read data tenure completes, a situation occurs where both pending operations (read and write) are cleared to take possession of the data bus. The pending read operation is not tainted by the outstanding write (occurred later in time) and is no longer held up by intra-class constraints once the initial read data tenure completes. Likewise, the write unit is no longer held up once the initial read data tenure completes, and the data__bus__busy reads signal goes inactive.

Clearly it is not permissible to allow both tenures to occur together. A choice as to which tenure is allowed to proceed must be made. In the preferred embodiment of the present invention, reads are always allowed to proceed, in these collision cases, but it is equally valid to allow writes to proceed, or some form of dynamic choice for a winning unit can be made.

To solve this collision in conjunction with the preferred embodiment, the present invention allows both units to initially advance to the bus. During the first cycle of any data tenure, the only action taken on the data bus is to drive DBG__and/or DBWO__. During the first cycle of the data tenure, in the collision case described above, both the read unit and the write unit drive their respective unit DBC__ signals (181). This presents no difficulties.

However, the write unit must be prevented from driving an active DBWO__indication. To drive DBWO__, the write unit tainted signals, which indicate on a per write unit basis the need to activate DBWO__are logically ANDed with the write unit "taking" bus signals by AND gates (185a and 185b). The outputs of these gates (185a–b) are processed by NOR gate (186) to produce the DBWO__signal driven to the bus interface logic (99a).

To augment this structure, OR gate (187) produces, from the individual read unit "taking" bus signals, an overall signal (187a) indicating when a read unit is obtaining control of the bus. This signal is further used by And gates (185a–b) to gate off driving DBWO__in the collision case mentioned above. When both the read and write unit attempt to simultaneously take control of the data bus, the write unit will be prevented from driving an active DBWO__signal by signal (187a).

Further, signal (187a) is propagated to latch (188) to produce a latched indication that a read unit has taken control of the bus (188a) in the previous cycle. All write units, during the first cycle of a data tenure, poll the output of this latch to determine if a read data unit took control of the bus coincidentally with the write unit. If the above condition occurs, the write units "backs off" and resets to a state to wait for the read data tenure to complete. The data__bus__busy__reads signal, which activates once the read data tenure commences, will prevent the write unit from regaining access to the data bus until the current winning read data tenure has been completed.

The method and apparatus of the preferred embodiment of the present invention, therefore, allows a write unit to speculatively proceed to the data bus even when read units may concurrently gain ownership of the data bus. In the case of collision, the write unit is prevented from driving a DBWO__indication, and is reset to a waiting state during a subsequent cycle by the latched indication of a read taking the bus (188a).

The preferred embodiment of the present invention allows for multiple read units with available data to be outstanding before a write unit. In this case, the write unit could speculatively attempt to gain the bus multiple times, and will be prevented by the read units from gaining ownership in these cases. After all previous read operations are complete, the write unit will gain ownership of the data bus. If, however, a read unit does not have data available and therefore cannot take ownership of the data bus immediately, then the write unit will be permitted to gain ownership of the bus and complete the write data tenure.

Another possible solution to the collision case where both read and write units are ready to take ownership of the bus is to use the overall read "taking bus" indicator signal (187a) as an additional input to NOR gate (151b of FIG. 15) rather then qualifying off the production of a DBWO__indication. The addition of the overall read "taking" bus signal to NOR gate (151b) will prevent any write unit from obtaining an inter-class "clear" indication when a read unit is taking control of the data bus. This will cause all write units to not attempt to take ownership of the data bus when a read unit is being granted ownership. However, the cone of logic necessary to produce the overall read "taking bus" indicators signals (187a) is deep and such an approach would constrain the maximum achievable clock frequency.

In summary, the present invention provides a means for controlling units responsible for transferring data between an out-of-order bus in an in-order bus. This is accomplished by the use of replicated logic structures which can be easily adapted to provide for varying number of units thereby allowing a varying number of outstanding operations on split transaction buses. In addition, the careful use of latches in the tainted units and the use of a speculative roll-back mechanism for write units allows the implementation of a higher frequency design.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. An apparatus for ordering operations and data received by a first bus having a first ordering policy according to a second ordering policy which is different from the first ordering policy, and for transferring the ordered data on a second bus having the second ordering policy, the apparatus comprising:

a plurality of execution units for storing operations and executing the transfer of data between the first and second buses, each one of the execution units being assigned to a group which represents a class of operations;

intra prioritizing means, for each group, for prioritizing the stored operations according to the second ordering policy exclusive of the operations stored in the other groups; and inter prioritizing means for determining which one of the prioritized operations proceed to execute according to the second ordering policy.

2. The apparatus of claim 1 wherein the plurality of execution units includes:

at least one first unit for a first class of operations, each first unit being assigned to a single first class operation at a time; and at least one second unit for a second class of operations, each second unit being assigned to a single second class operation at a time.

3. The apparatus of claim 2 wherein the intra means includes:

means for prioritizing the assigned operations according to the order in which they were received.

4. The apparatus of claim 3 wherein the inter means includes:

a tainted unit, for each one of the first and second units, for determining which one of the prioritized operations, residing in either the first or second units, proceed to execute according to the second ordering policy.

5. The apparatus of claim 4 wherein the first class of operations are read operations, and the second class of operations are write operations.

6. The apparatus of claim 5 wherein the inter means includes:

combining means for initially allowing both an assigned read and write operation to proceed to attempt to take control over the second bus, but upon detecting the attempt, allowing the assigned read operation to execute prior to the assigned write operation.

7. The apparatus of claim 5 wherein the inter means includes:

combining means for initially allowing both an assigned read and write operation to proceed to attempt to take control over the second bus, but upon detecting the attempt, allowing the assigned write operation to execute prior to the assigned read operation.

8. The apparatus of claim 6 wherein the first bus is an out-of-order bus, and the second bus is a partially-in-order bus.

9. A method of ordering operations and data received by a first bus having a first ordering policy according to a second ordering policy which is different from the first ordering policy, and of transferring the ordered data on a second bus having the second ordering policy, the method comprising the steps of:

receiving a plurality of operations from the second bus which require data to be read from or written to the first bus;

assigning each one of the received operations to a group which represents a class of operations;

prioritizing, for each group, each one of the assigned operations according to the second ordering policy exclusive of the operations assigned to other groups; and ordering the prioritized operations for all groups according to the second ordering policy.

10. The method of claim 9 wherein the plurality of operations are either read or write operations.

11. The method of claim 10 wherein the step of assigning includes the steps of:

assigning each one of the read operations to an individual read unit; and assigning each one of the write operations to an individual write unit.

12. The method of claim 11 wherein the step of prioritizing includes the step of:

prioritizing the assigned operations according to the order in which they were received.

13. The method of claim 12 wherein the step of ordering includes the step of:

initially allowing both an ordered assigned read and write operation to proceed to attempt to take control over the second bus, but upon detecting the attempt, allowing the ordered read operation to execute prior to the assigned write operation.

14. The method of claim 12 wherein the step of ordering includes the step of:

initially allowing both an ordered assigned read and write operation to proceed to attempt to take control over the second bus, but upon detecting the attempt, allowing the ordered write operation to execute prior to the assigned read operation.

15. An apparatus for ordering operations and data received by a first bus having a first ordering policy according to a second ordering policy which is different from the first ordering policy, and of transferring the ordered data on a second bus having the second ordering policy, the apparatus comprising:

means for receiving a plurality of operations from the second bus which require data to be read from or written to the first bus;

means for assigning each one of the received operations to a group which represents a class of operations;

means for prioritizing, for each group, each one of the assigned operations according to the second ordering policy exclusive of the operations assigned to other groups; and means for ordering the prioritized operations for all groups according to the second ordering policy.

16. The apparatus of claim 15 wherein the plurality of operations are either read or write operations.

17. The apparatus of claim 16 wherein the means for assigning includes:

means for assigning each one of the read operations to an individual read unit; and means for assigning each one of the write operations to an individual write unit.

18. The apparatus of claim 17 wherein the means for prioritizing includes:

means for prioritizing the assigned operations according to the order in which they were received.

19. The apparatus of claim 18 wherein the means for ordering includes:

means for initially allowing both an ordered assigned read and write operation to proceed to attempt to take control over the second bus, but upon detecting the attempt, allowing the ordered read operation to execute prior to the assigned write operation.

20. The apparatus of claim 18 wherein the means for ordering includes:

means for initially allowing both an ordered assigned read and write operation to proceed to attempt to take control over the second bus, but upon detecting the attempt, allowing the ordered write operation to execute prior to the assigned read operation.

* * * * *